US012732005B2

(12) United States Patent
Shi et al.

(10) Patent No.: US 12,732,005 B2
(45) Date of Patent: Sep. 8, 2026

(54) FOLDABLE ELECTRONIC DEVICE

(71) Applicant: Honor Device Co., Ltd., Shenzhen (CN)

(72) Inventors: Cong Shi, Shenzhen (CN); Chen Zhu, Shenzhen (CN); Yang Mao, Shenzhen (CN); Tieli Zhang, Shenzhen (CN); Changying Zhang, Shenzhen (CN)

(73) Assignee: HONOR DEVICE CO., LTD., Shenzhen (CN)

(*) Notice: Subject to any disclaimer, the term of this patent is extended or adjusted under 35 U.S.C. 154(b) by 2 days.

(21) Appl. No.: 18/841,208

(22) PCT Filed: Jan. 10, 2023

(86) PCT No.: PCT/CN2023/071626

§ 371 (c)(1),
(2) Date: Aug. 23, 2024

(87) PCT Pub. No.: WO2024/016616

PCT Pub. Date: Jan. 25, 2024

(65) Prior Publication Data

US 2025/0175015 A1 May 29, 2025

(30) Foreign Application Priority Data

Jul. 22, 2022 (CN) ......................... 202221900700.2

(51) Int. Cl.
*H02J 7/56* (2026.01)
*G06F 1/16* (2006.01)
(Continued)

(52) U.S. Cl.
CPC .............. *H02J 7/56* (2026.01); *G06F 1/1652* (2013.01); *G06F 1/1681* (2013.01); *G06F 1/263* (2013.01);
(Continued)

(58) Field of Classification Search
CPC ...... G06F 1/263; G06F 1/1652; G06F 1/1677; G06F 1/1681; G06F 1/1683; G06F 1/26;
(Continued)

(56) References Cited

U.S. PATENT DOCUMENTS 11,715,960 B2 * 8/2023 Gao .................. H02J 7/007188 320/107
11,777,330 B2 * 10/2023 Justin .................... H02J 7/0071 320/162
(Continued)

FOREIGN PATENT DOCUMENTS

CN 110213406 A 9/2019
CN 209692815 U 11/2019
(Continued)

OTHER PUBLICATIONS

Liu, M., et al., "Dual Frequency Hierarchical Modular Multilayer Battery Balancer Architecture" IEEE Transactions On Power Electronics, vol. 36, No. 3, Mar. 2021, 12 pages.

*Primary Examiner* — Terrell S Johnson
(74) *Attorney, Agent, or Firm* — Conley Rose, P.C.

(57) ABSTRACT

A foldable electronic device includes a first power management module, a first load, and a first battery pack disposed in a first foldable portion of the foldable electronic device. A second power management module, a second load, and a second battery pack are disposed in a second foldable portion in the foldable electronic device. The first power management module controls the first battery pack to supply power to the first load, and the second power management module controls the second battery pack to supply power to the second load. The foldable electronic device further includes an isolation circuit, and the isolation circuit may perform voltage balancing on voltages of two connected batteries.

20 Claims, 11 Drawing Sheets

(51) Int. Cl.
*G06F 1/26* (2006.01)
*H02J 7/00* (2026.01)
*H02J 7/82* (2026.01)
*H02J 7/96* (2026.01)

(52) U.S. Cl.
CPC .............. *H02J 7/825* (2026.01); *H02J 7/855* (2026.01); *H02J 7/96* (2026.01)

(58) Field of Classification Search
CPC ...... H02J 7/342; H02J 7/56; H02J 7/70; H02J 7/825; H02J 7/855; H02J 7/96
See application file for complete search history.

(56) References Cited

U.S. PATENT DOCUMENTS

| | | | | |
|---|---|---|---|---|
| 2020/0412136 | A1 | 12/2020 | Kristjansson et al. | |
| 2021/0124396 | A1 | 4/2021 | Chen | |
| 2021/0135478 | A1* | 5/2021 | Schline | H02J 7/342 |
| 2021/0208655 | A1 | 7/2021 | Fan | |
| 2022/0011817 | A1 | 1/2022 | Kim | |
| 2024/0204539 | A1 | 6/2024 | Qiu et al. | |

FOREIGN PATENT DOCUMENTS

| | | | |
|---|---|---|---|
| CN | 112467811 | A | 3/2021 |
| CN | 113489103 | A | 10/2021 |
| CN | 114268137 | A | 4/2022 |
| CN | 114498803 | A | 5/2022 |

* cited by examiner

FOLDABLE ELECTRONIC DEVICE

CROSS-REFERENCE TO RELATED APPLICATIONS

This is a U.S. National Stage of International Application No. PCT/CN2023/071626 filed on Jan. 10, 2023, which claims priority to Chinese Patent Application No. 202221900700.2, filed with the China National Intellectual Property Administration on Jul. 22, 2022, both of which are incorporated herein by reference in their entireties.

TECHNICAL FIELD

Embodiments of this application relate to the field of electronic technologies, and in particular, to a foldable electronic device.

BACKGROUND

With continuous development of electronic devices such as mobile phones, electronic devices with a foldable form gradually become a trend of industry development. In an unfolded state, the foldable electronic device can obtain a relatively large display area, to improve a viewing effect. In a folded state, the foldable electronic device can obtain a relatively small volume, and is convenient for a user to carry.

To extend a battery life of the foldable electronic device, at least one battery may be disposed in each of a first foldable portion and a second foldable portion in the foldable electronic device.

However, when some batteries in a current foldable electronic device supply power to a load, a power transmission path of the battery is relatively long, and a relatively large loss is caused by path impedance. To reduce the path impedance, a trace width in the power transmission path may be increased. However, an increase in the trace width in the power transmission path leads to a reduction in reliability of a rotation mechanism and a flexible screen in the foldable electronic device.

SUMMARY

Embodiments of this application provide a foldable electronic device. A power management module is disposed in each of a first foldable portion and a second foldable portion, to control a corresponding battery to supply power to a load, so as to reduce a trace length corresponding to a power transmission path, and improve reliability of a rotation mechanism and a flexible screen in the foldable electronic device.

According to a first aspect, an embodiment of this application provides a foldable electronic device. The foldable electronic device includes a first foldable portion, a second foldable portion, and a rotation mechanism located between the first foldable portion and the second foldable portion. The first foldable portion includes a first power management module, a first load, and a first battery pack, and the first battery pack includes at least one battery. The second foldable portion includes a second power management module, a second load, and a second battery pack, and the second battery pack includes at least one battery. The first power management module is separately connected to the first battery pack and the first load, and is configured to control the first battery pack to supply power to the first load. The second power management module is separately connected to the second battery pack and the second load, and is configured to control the second battery pack to supply power to the second load. The foldable electronic device further includes an isolation circuit, and the isolation circuit is separately connected to two batteries, and is configured to perform voltage balancing on voltages of the two batteries connected to the isolation circuit.

In this way, a battery voltage provided by the first battery pack may be converted into a system voltage by using the first power management module, to supply power to the first load disposed in the first foldable portion, and a battery voltage provided by the second battery pack may be converted into a system voltage by using the second power management module, to supply power to the second load disposed in the second foldable portion, so that a power transmission path existing when the first battery pack supplies power to the first load corresponds to a relatively short trace, and a power transmission path existing when the second battery pack supplies power to the second load also corresponds to a relatively short trace, to reduce a loss caused by trace impedance in the power transmission path. Correspondingly, a trace width in the power transmission path does not need to be increased, to improve reliability of the rotation mechanism and reliability of a flexible screen supported by the rotation mechanism. In addition, the isolation circuit may balance the voltages of the two batteries connected to the isolation circuit, to reduce a voltage difference between the two batteries connected to the isolation circuit, so as to limit a mutual charging current between the two batteries connected to the isolation circuit, that is, reduce a possibility that a trace distributed on an FPC is burnt due to high current mutual charging generated between the two batteries connected to the isolation circuit, and improve safety and reliability of the foldable electronic device.

In a possible implementation, the isolation circuit is connected between a first target battery and a second target battery; and the foldable electronic device further includes an electrical parameter detection module and a processing module, the isolation circuit includes an isolation module, and the processing module is separately connected to the electrical parameter detection module and the isolation module; the electrical parameter detection module is configured to detect an electrical parameter related to the first target battery and the second target battery, where the electrical parameter includes a voltage of the first target battery and a voltage of the second target battery, or the electrical parameter includes a current flowing through the isolation module; and the processing module is configured to control a working status of the isolation module based on the electrical parameter, where the working status of the isolation module includes any one of an on state, a balanced state, and an off state. In this way, the working status of the isolation module is controlled based on the electrical parameter detected by the electrical parameter detection module, so that when the isolation module is controlled to be in the balanced state, a mutual charging current between the two batteries connected to the isolation circuit can be reduced.

In a possible implementation, the processing module is a processor in the foldable electronic device, and the processor and the isolation circuit are two different parts; or the processing module is a first control unit in the isolation circuit. In this way, the processor or the first control unit in the isolation circuit may be used to control the working status of the isolation module, to enrich an implementable manner of the foldable electronic device.

In a possible implementation, the electrical parameter detection module includes a first voltage detection element and a second voltage detection element, the first voltage detection element is connected to the first target battery, and the second voltage detection element is connected to the second target battery; the first voltage detection element is configured to detect the voltage of the first target battery; and the second voltage detection element is configured to detect the voltage of the second target battery, where the electrical parameter includes the voltage of the first target battery and the voltage of the second target battery. In this way, a manner of controlling the working status of the isolation module based on the voltage of the first target battery and the voltage of the second target battery is provided.

In a possible implementation, the electrical parameter detection module includes a current detection element, and the current detection element is connected to a path between the first target battery and the second target battery; and the current detection element is configured to detect the current flowing through the isolation module, where the electrical parameter includes the current flowing through the isolation module. In this way, a manner of controlling the working status of the isolation module based on the current flowing through the isolation module is provided.

In a possible implementation, the processing module is specifically configured to: when the foldable electronic device is in a discharged state, and the electrical parameter does not meet a preset condition, control the isolation module to be in the balanced state, to perform voltage balancing on the voltage of the first target battery and the voltage of the second target battery; and the processing module is further configured to: when the foldable electronic device is in a charged state, and the electrical parameter does not meet the preset condition, control a power management module connected to a third target battery to charge the third target battery until the electrical parameter meets the preset condition, where the third target battery is a battery with a lower voltage in the first target battery and the second target battery, and when a voltage difference between the first target battery and the second target battery is greater than a preset voltage, the electrical parameter does not meet the preset condition; or when the current flowing through the isolation module is greater than a preset current, the electrical parameter does not meet the preset condition. In this way, when the foldable electronic device is in the discharged state, and the electrical parameter does not meet the preset condition, voltage balancing is implemented based on the isolation module; and when the foldable electronic device is in the charged state, and the electrical parameter does not meet the preset condition, voltage balancing is implemented based on a power management module connected to a battery with a relatively low voltage, to improve charging efficiency of the foldable electronic device while reducing a mutual charging current between the two batteries connected to the isolation circuit.

In a possible implementation, the processing module is specifically configured to: when the electrical parameter meets a preset condition, control the isolation module to be in the on state, so that the first target battery and the second target battery are discharged in parallel, or the first target battery and the second target battery are charged in parallel, where when a voltage difference between the first target battery and the second target battery is less than or equal to a preset voltage, the electrical parameter meets the preset condition; or when the current flowing through the isolation module is less than or equal to a preset current, the electrical parameter meets the preset condition.

In a possible implementation, the isolation module includes a first switch element; and a first terminal of the first switch element is connected to the first target battery, and a second terminal of the first switch element is connected to the second target battery.

In a possible implementation, a control terminal of the first switch element is connected to the processing module; or the isolation module further includes a second switch element; and a control terminal of the second switch element is connected to the processing module, a first terminal of the second switch element is connected to a control terminal of the first switch element, and a second terminal of the second switch element is connected to a ground terminal.

In a possible implementation, the isolation module includes a third switch element and a fourth switch element; and a first terminal of the third switch element is connected to the first target battery, a second terminal of the third switch element is connected to a first terminal of the fourth switch element, and a second terminal of the fourth switch element is connected to the second target battery.

In a possible implementation, both a control terminal of the third switch element and a control terminal of the fourth switch element are connected to the processing module; or the isolation module further includes a fifth switch element; and a control terminal of the fifth switch element is connected to the processing module, a first terminal of the fifth switch element is connected to a control terminal of the third switch element and a control terminal of the fourth switch element, and a second terminal of the fifth switch element is connected to a ground terminal.

In a possible implementation, each of the first power management module and the second power management module includes a first switch unit, a second switch unit, and a second control unit; a control terminal of the first switch unit is connected to the second control unit, a first terminal of the first switch unit is connected to a charging interface, and a second terminal of the first switch unit is connected to a corresponding load; and the first switch unit is configured to: when the foldable electronic device is in a charged state, convert an input voltage provided by the charging interface into a system voltage, to supply power to the load connected to the first switch unit; and a control terminal of the second switch unit is connected to the second control unit, a first terminal of the second switch unit is connected to the second terminal of the first switch unit, and a second terminal of the second switch unit is connected to a corresponding battery; and the second switch unit is configured to: when the foldable electronic device is in the charged state, charge the battery connected to the second switch unit by using the system voltage, and when the foldable electronic device is discharged, supply power to a load connected to the second switch unit by using a battery voltage provided by the battery connected to the second switch unit.

In a possible implementation, the foldable electronic device further includes a processor, and the processor is separately connected to the first power management module and the second power management module; and the processor is configured to: when the foldable electronic device is in the charged state, and a fourth target battery is fully charged but a fifth target battery is not fully charged, control a second switch unit in a power management module connected to the fourth target battery to be cut off, and control a second switch unit in a power management module connected to the fifth target battery to be turned on, where the fourth target battery is at least one battery in the foldable electronic device, and the fifth target battery is at least one battery in the foldable electronic device. In this way, the first power management module is disposed in the first foldable portion, and the second power management module is disposed in the second foldable portion, so that batteries in both the first battery pack and the second battery pack can be fully charged.

In a possible implementation, the first switch unit includes a sixth switch element, a seventh switch element, an eighth switch element, and an inductor, and the second switch unit includes a ninth switch element; a control terminal of the sixth switch element is connected to the second control unit, a first terminal of the sixth switch element is connected to the charging interface, and a second terminal of the sixth switch element is connected to a first terminal of the seventh switch element; a control terminal of the seventh switch element is connected to the second control unit, and a second terminal of the seventh switch element is connected to a first terminal of the inductor; and a second terminal of the inductor is connected to a load corresponding to the power management module; a control terminal of the eighth switch element is connected to the second control unit, a first terminal of the eighth switch element is connected to the second terminal of the seventh switch element, and a second terminal of the eighth switch element is connected to a ground terminal; and a control terminal of the ninth switch element is connected to the second control unit, a first terminal of the ninth switch element is connected to the second terminal of the inductor, and a second terminal of the ninth switch element is connected to a corresponding battery.

In a possible implementation, each of the first battery pack and the second battery pack includes one battery, the foldable electronic device includes one isolation circuit, and the isolation circuit is located in the first foldable portion or the second foldable portion. In this way, the embodiments of this application are applicable to a foldable electronic device including two batteries and two power management modules.

DESCRIPTION OF EMBODIMENTS

To clearly describe the technical solutions in the embodiments of this application, in the embodiments of this application, words such as "first" and "second" are used to distinguish between same items or similar items with basically the same functions and effects. For example, a first chip and a second chip are merely intended to distinguish between different chips, and are not intended to limit a sequence of the first chip and the second chip. A person skilled in the art may understand that the words such as "first" and "second" do not limit a quantity and an execution sequence, and the words such as "first" and "second" do not indicate a definite difference.

It should be noted that the words such as "example" or "for example" in the embodiments of this application are used to indicate an example, an illustration, or a description. Any embodiment or design solution described as an "example" or "for example" in this application should not be explained as being more preferred or having more advantages than other embodiments or design solutions. Exactly, the words such as "example" or "for example" are used to present related concepts in a specific manner.

In the embodiments of this application, "at least one" means one or more, and "a plurality of" means two or more. "And/Or" describes an association relationship between associated objects, and represents that three relationships may exist. For example, "A and/or B" may represent the following cases: Only A exists, both A and B exist, and only B exists, where A and B may be singular or plural. The character "/" usually indicates an "or" relationship between associated objects. "At least one of the following items" or a similar expression thereof means any combination of these items, including a single item or any combination of a plurality of items. For example, at least one of a, b, or c may represent a, b, c, a and b, a and c, b and c, or a, b, and c, where a, b, and c may be singular or plural.

The foldable electronic device provided in the embodiments of this application may be an electronic device with a foldable form, for example, a mobile phone, a notebook computer, a tablet computer (Pad), a wearable device (for example, a smartwatch or a smart band), a vehicle-mounted device, an ultra-mobile personal computer (ultra-mobile personal computer, UMPC), a netbook, or a personal digital assistant (personal digital assistant, PDA). A specific technology and a specific device form that are used by the foldable electronic device are not limited in the embodiments of this application.

The foldable electronic device has advantages such as advantages that in an unfolded state, the foldable electronic device can obtain a relatively large display area, to improve a viewing effect of a user, and in a folded state, the foldable electronic device can obtain a relatively small volume, and is convenient for the user to carry, and therefore gradually becomes a trend of industry development.

Figure 1:
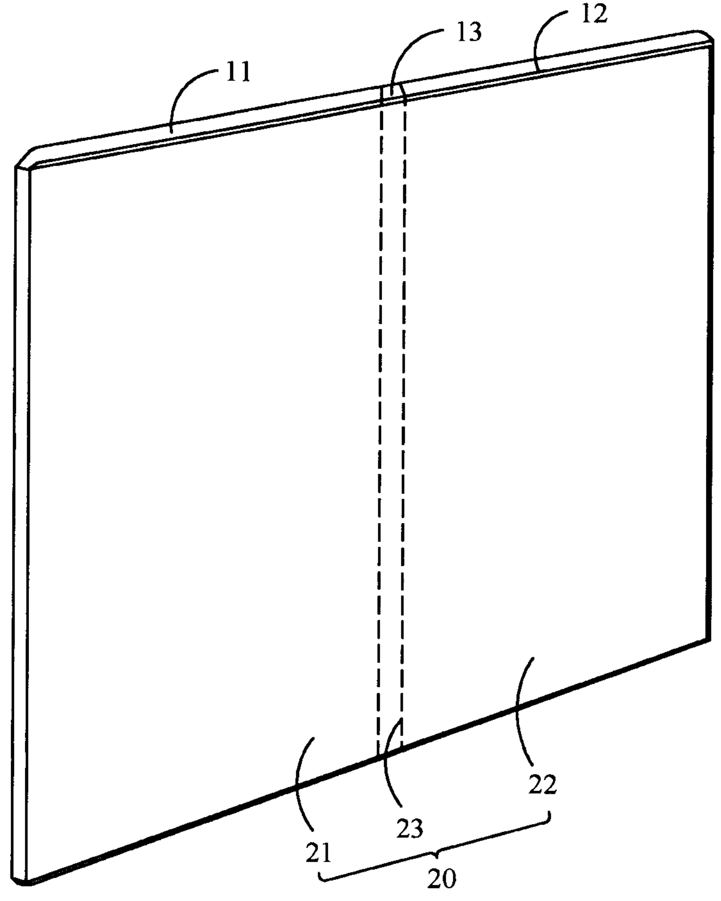
FIG. 1 is a schematic diagram of a structure of a foldable electronic device in an unfolded state according to an embodiment of this application.
Figure 2:
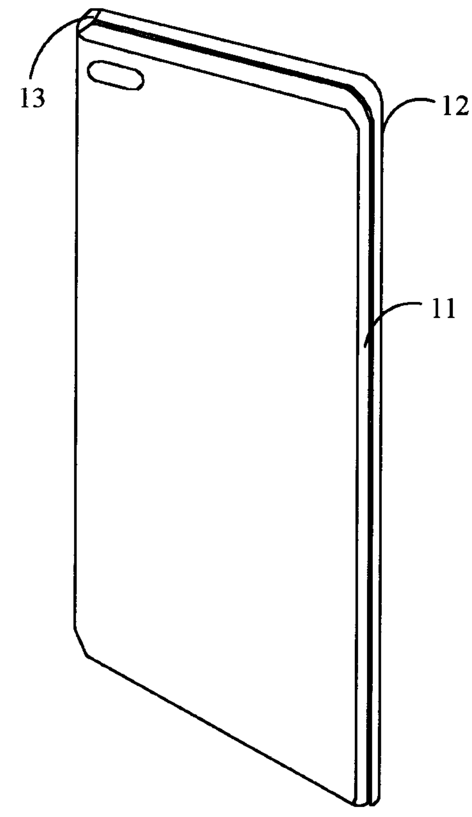
FIG. 2 is a schematic diagram of a structure of a foldable electronic device in a folded state according to an embodiment of this application.

As shown in FIG. 1 and FIG. 2, the foldable electronic device may include a first foldable portion 11, a second foldable portion 12, and a rotation mechanism 13 located between the first foldable portion 11 and the second foldable portion 12. The rotation mechanism 13 may be a rotating shaft. The rotation mechanism 13 is separately connected to the first foldable portion 11 and the second foldable portion 12, and the first foldable portion 11 and the second foldable portion 12 are respectively located on two sides of the rotation mechanism 13. For example, the first foldable portion 11 is located on a left side of an axis of the rotation mechanism 13, and the second foldable portion 12 is located on a right side of the axis of the rotation mechanism 13. The first foldable portion 11 and the second foldable portion 12 may separately rotate around the axis of the rotation mechanism 13.

The foldable electronic device further includes a flexible screen 20 disposed on a same side of the first foldable portion 11, the second foldable portion 12, and the rotation mechanism 13. The first foldable portion 11, the second foldable portion 12, and the rotation mechanism 13 are configured to carry the flexible screen 20.

The flexible screen 20 is configured to display an image, a video, and the like. The flexible screen 20 may be an organic light-emitting diode (organic light-emitting diode, OLED) display screen or another flexible display screen. The flexible screen 20 includes a first non-bendable region 21, a second non-bendable region 22, and a bendable region 23. The bendable region 23 is located between the first non-bendable region 21 and the second non-bendable region 22. The first non-bendable region 21 may be fastened to the first foldable portion 11 by using an adhesive layer, and the second non-bendable region 22 may be fastened to the second foldable portion 12 by using an adhesive layer. The bendable region 23 in the flexible screen 20 is made of a flexible material, and the first non-bendable region 21 and the second non-bendable region 22 in the flexible screen 20 may be made of a flexible material, or may be made of a rigid material. This is not limited in this embodiment of this application.

In this way, the flexible screen 20 may correspondingly present a folded state, an unfolded state, or another state as the first foldable portion 11 and the second foldable portion 12 rotate relative to the rotation mechanism 13.

For example, as shown in FIG. 1, when the first foldable portion 11 and the second foldable portion 12 rotate to a maximum angle relative to the rotation mechanism 13, the flexible screen 20 may be in the unfolded state. In this case, an angle between the first foldable portion 11 and the second foldable portion 12 may be 180°. Certainly, due to impact of some process errors, when the foldable electronic device is in the unfolded state, the angle between the first foldable portion 11 and the second foldable portion 12 may alternatively be 175°, 185°, or the like.

As shown in FIG. 2, when the first foldable portion 11 and the second foldable portion 12 rotate in a direction close to each other relative to the rotation mechanism 13 to reduce the angle between the first foldable portion 11 and the second foldable portion 12, the flexible screen 20 may be in the folded state. When the flexible screen 20 is in the folded state, the bendable region 23 is bent, and the first non-bendable region 21 and the second non-bendable region 22 are disposed opposite to each other.

When the flexible screen 20 is in the unfolded state, the flexible screen 20 has a relatively large display area in this case, that is, display may be performed in all of the first non-bendable region 21, the second non-bendable region 22, and the bendable region 23 in the flexible screen 20, to improve a viewing effect of a user. When the flexible screen 20 is in the folded state, the foldable electronic device has a relatively small volume in this case, and therefore is convenient for the user to carry.

It should be noted that the foldable electronic device shown in FIG. 1 and FIG. 2 is described by using a foldable mobile phone as an example. The foldable mobile phone may be an inward foldable mobile phone (that is, the flexible screen 20 is folded inward), or may be an outward foldable mobile phone (that is, the flexible screen 20 is folded outward). Certainly, the foldable electronic device in this embodiment of this application may alternatively be another foldable device.

Figure 3:
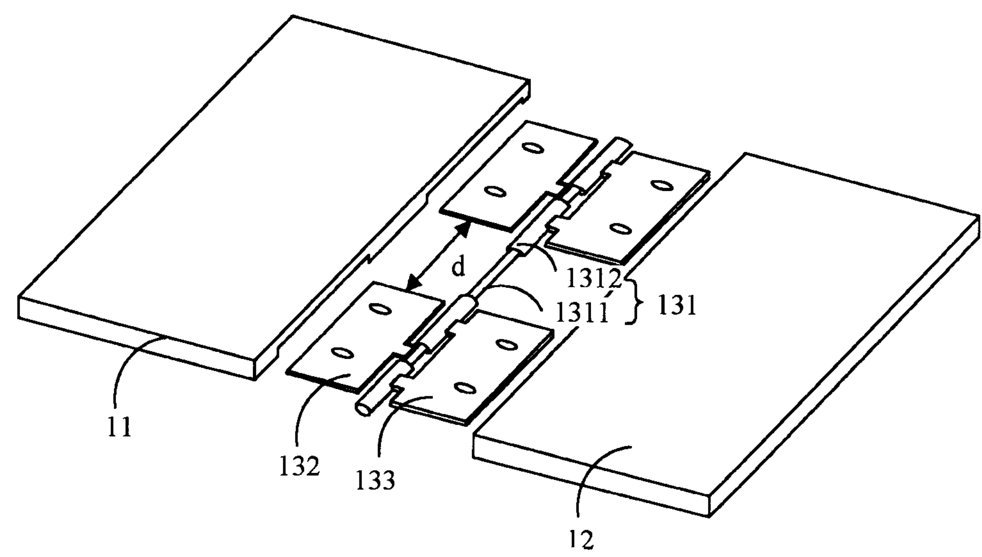
FIG. 3 is a schematic diagram of a split structure of a foldable electronic device according to an embodiment of this application.

To better understand rotation of the first foldable portion 11 and the second foldable portion 12 relative to the rotation mechanism 13 in this embodiment of this application, the following provides descriptions with reference to a schematic diagram of a split structure of the foldable electronic device shown in FIG. 3.

The rotation mechanism 13 may include a rotating shaft body 131, a first blade 132, and a second blade 133. There may be a plurality of first blades 132, and there may also be a plurality of second blades 133. For example, there may be two first blades 132 and two second blades 133, as shown in FIG. 3.

The rotating shaft body 131 includes a first rotating shaft 1311 and a second rotating shaft 1312 that are coaxially disposed, and an axis of the first rotating shaft 1311 and an axis of the second rotating shaft 1312 are used as the axis of the rotation mechanism 13.

The first blade 132 may also be referred to as a first swing arm, one end of the first blade 132 is connected to the first rotating shaft 1311 in the rotating shaft body 131, and the other end of the first blade 132 extends into a groove below the first foldable portion 11, and is connected to the first foldable portion 11.

The second blade 133 may also be referred to as a second swing arm, one end of the second blade 133 is connected to the second rotating shaft 1312 in the rotating shaft body 131, and the other end of the second blade 133 extends into a groove below the second foldable portion 12, and is connected to the second foldable portion 12.

The first rotating shaft 1311 drives, through the first blade 132, the first foldable portion 11 to rotate around the axis of the first rotating shaft 1311. Correspondingly, the second rotating shaft 1312 drives, through the second blade 133, the second foldable portion 12 to rotate around the axis of the second rotating shaft 1312. The axis of the first rotating shaft 1311 and the axis of the second rotating shaft 1312 are used as the axis of the rotation mechanism 13. Therefore, the first foldable portion 11 and the second foldable portion 12 may separately rotate around the axis of the rotation mechanism 13.

As shown in FIG. 3, avoidance space between the two first blades 132 and avoidance space between the two second blades 133 are mainly used to place a flexible printed circuit (flexible printed circuit, FPC). A trace for performing electrical signal transmission between the first foldable portion 11 and the second foldable portion 12 is distributed on the FPC.

In a related technology, to extend a battery life of the foldable electronic device, at least one battery may be disposed in each of the first foldable portion 11 and the second foldable portion 12 in the foldable electronic device, to improve standby duration of the foldable electronic device.

Figure 4:
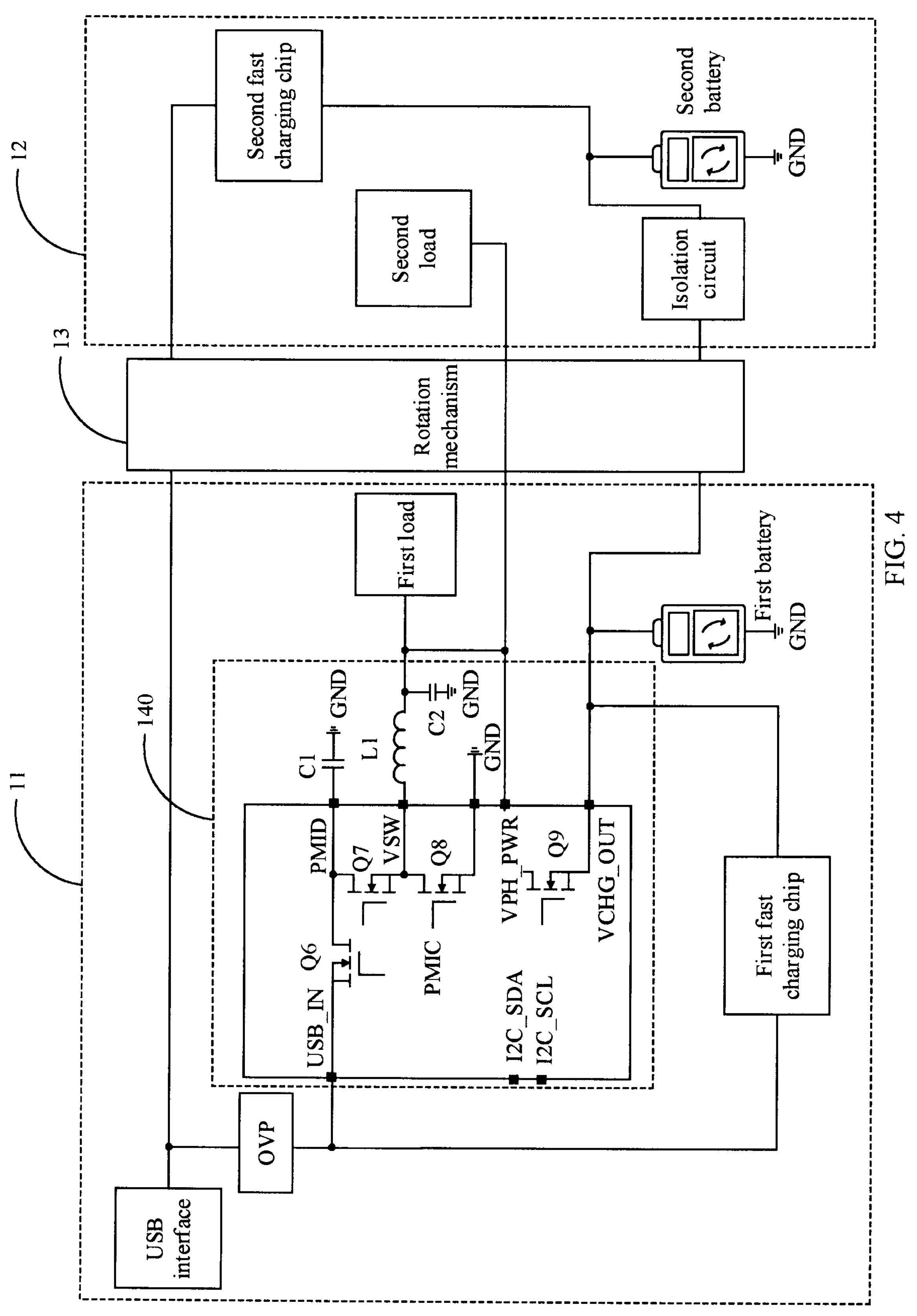
FIG. 4 is a schematic diagram of a circuit structure of a foldable electronic device according to a related technology.

As shown in FIG. 4, a first battery is disposed in the first foldable portion 11, and a second battery is disposed in the second foldable portion 12, that is, the first battery and the second battery are respectively located on a left side and a right side of the rotation mechanism 13.

Different types of load peripherals are respectively disposed on the left side and the right side of the rotation mechanism 13. A first load is disposed in the first foldable portion 11. For example, the first load may be a load peripheral such as a processor or a memory. A second load is disposed in the second foldable portion 12. For example, the second load may be a load peripheral such as a speaker or a camera.

As shown in FIG. 4, a power management module 140 is disposed only in the first foldable portion 11, and both a system voltage provided to the first load and a system voltage provided to the second load are managed and output by the power management module 140 disposed in the first foldable portion 11.

In addition, a universal serial bus (universal serial bus, USB) interface, an overvoltage protection (over voltage protect, OVP) circuit, a first fast charging chip, and the like are further disposed in the first foldable portion 11. The power management module 140 includes a power management integrated circuit (power management IC, PMIC) chip and some peripheral circuits. The peripheral circuits may include a first capacitor C1, a second capacitor C2, an inductor L1, and the like. A second fast charging chip, an isolation circuit, and the like are further disposed in the second foldable portion 12.

The power management module 140 may be separately connected to the first load and the second load. The power management module 140 may convert a battery voltage provided by the first battery into a system voltage and provide the system voltage to the first load, to supply power to the first load. The power management module 140 may further convert a battery voltage provided by the second battery into a system voltage and provide the system voltage to the second load, to supply power to the second load.

For the second load in the second foldable portion 12, the battery voltage provided by the second battery is transmitted to the power management module 140 disposed in the first foldable portion 11 by using a power trace distributed on the FPC disposed in the rotation mechanism 13, the power management module 140 converts the battery voltage provided by the second battery into a system voltage Vsys, and then the system voltage Vsys is transmitted to the second load disposed in the second foldable portion 12 by using the power trace distributed on the FPC disposed in the rotation mechanism 13, to supply power to the second load disposed in the second foldable portion 12.

Therefore, it may be learned that when the second battery disposed in the second foldable portion 12 supplies power to the second load disposed in the second foldable portion 12, a trace corresponding to a power transmission path forms a loop path, and the power transmission path corresponds to a relatively long trace. There is specific impedance for the trace corresponding to the power transmission path. Therefore, when the power transmission path corresponds to a relatively long trace, a relatively large loss is caused by trace impedance in the power transmission path.

To reduce the loss caused by the trace impedance in the power transmission path, a trace width in the power transmission path may be increased, to reduce the trace impedance in the power transmission path. However, when the trace width in the power transmission path is increased, a width of the FPC disposed in the rotation mechanism 13 is increased.

The first blade 132 and the second blade 133 included in the rotation mechanism 13 cannot be disposed at a position of the FPC disposed in the rotation mechanism 13. When the width of the FPC disposed in the rotation mechanism 13 is increased, avoidance space of a main body structure (that is, the first blade 132 and the second blade 133) in the rotation mechanism 13 for the FPC is increased, that is, widths d of the avoidance space between the two first blades 132 and the avoidance space between the two second blades 133 in FIG. 3 are increased in a Y direction.

Correspondingly, occupied space of the first blade 132 and the second blade 133 in the rotation mechanism 13 is reduced, and reliability of the rotation mechanism 13 is reduced. In addition, the first blade 132 and the second blade 133 may further serve to support the flexible screen 20. For a region in which the FPC is located, due to a lack of the first blade 132 and the second blade 133, the region cannot serve to support the flexible screen 20. When a width d of the region in which the FPC is located is larger, a support effect of the rotation mechanism 13 for the flexible screen 20 is worse. Therefore, in a process in which the user uses the foldable electronic device, if the user presses the flexible screen 20, reliability of the flexible screen 20 supported by the rotation mechanism 13 is affected.

It should be noted that the second load disposed in the second foldable portion 12 does not directly obtain power from the second battery disposed in the second foldable portion 12, but needs to obtain power from the power management module 140 disposed in the first foldable portion 11. This is because of a recharging problem. A recharging principle is as follows: After a battery is fully charged, if the user still does not unplug a charger connected to the USB interface, the battery cannot continue to be charged in this case, and the load in the foldable electronic device cannot continue to consume power of the battery. Otherwise, when the user unplugs the charger after using the foldable electronic device for a period of time, a power level of the battery does not reach 100%. Therefore, to resolve the recharging problem, after the battery is fully charged, power consumed by the load needs to be obtained from the charger to bypass the battery. A module that implements this function is the power management module 140.

A switch element, for example, a ninth switch element Q9 shown in FIG. 4, is disposed in the power management module 140. The ninth switch element Q9 is connected between the load and the battery. When the battery is charged by using the charger, the ninth switch element Q9 is turned on, to charge the battery through the ninth switch element Q9. When the battery needs to supply power to the load, the ninth switch element Q9 is turned on, so that the load consumes power of the battery through the ninth switch element Q9. After the battery is fully charged and the USB interface is still connected to the charger, the ninth switch element Q9 is in a cut-off state, so that the battery is bypassed outside the load, and power consumed by the load is supplied by the charger.

Based on this, the embodiments of this application provide a foldable electronic device. A first power management module, a first load, and a first battery pack are disposed in a first foldable portion 11, and a second power management module, a second load, and a second battery pack are disposed in a second foldable portion 12. The first power management module is separately connected to the first battery pack and the first load, and is configured to control the first battery pack to supply power to the first load. The second power management module is separately connected to the second battery pack and the second load, and is configured to control the second battery pack to supply power to the second load. In this way, a battery voltage provided by the first battery pack may be converted into a system voltage by using the first power management module, to supply power to the first load disposed in the first foldable portion 11, and a battery voltage provided by the second battery pack may be converted into a system voltage by using the second power management module, to supply power to the second load disposed in the second foldable portion 12, so that a power transmission path existing when the first battery pack supplies power to the first load corresponds to a relatively short trace, and a power transmission path existing when the second battery pack supplies power to the second load also corresponds to a relatively short trace, to reduce a loss caused by trace impedance in the power transmission path. Correspondingly, a trace width in the power transmission path does not need to be increased, to improve reliability of a rotation mechanism 13 and reliability of a flexible screen 20 supported by the rotation mechanism 13.

In addition, the foldable electronic device further includes an isolation circuit, and the isolation circuit is separately connected to two batteries, and is configured to perform voltage balancing on voltages of the two batteries connected to the isolation circuit. In this way, the voltages of the two batteries connected to the isolation circuit may be balanced, to reduce a voltage difference between the two batteries connected to the isolation circuit, so as to limit a mutual charging current between the two batteries connected to the isolation circuit, that is, reduce a possibility that a trace distributed on an FPC is burnt due to high current mutual charging generated between the two batteries connected to the isolation circuit, and improve safety and reliability of the foldable electronic device.

To better understand the embodiments of this application, the following describes a structure of the foldable electronic device in the embodiments of this application.

Figure 5:
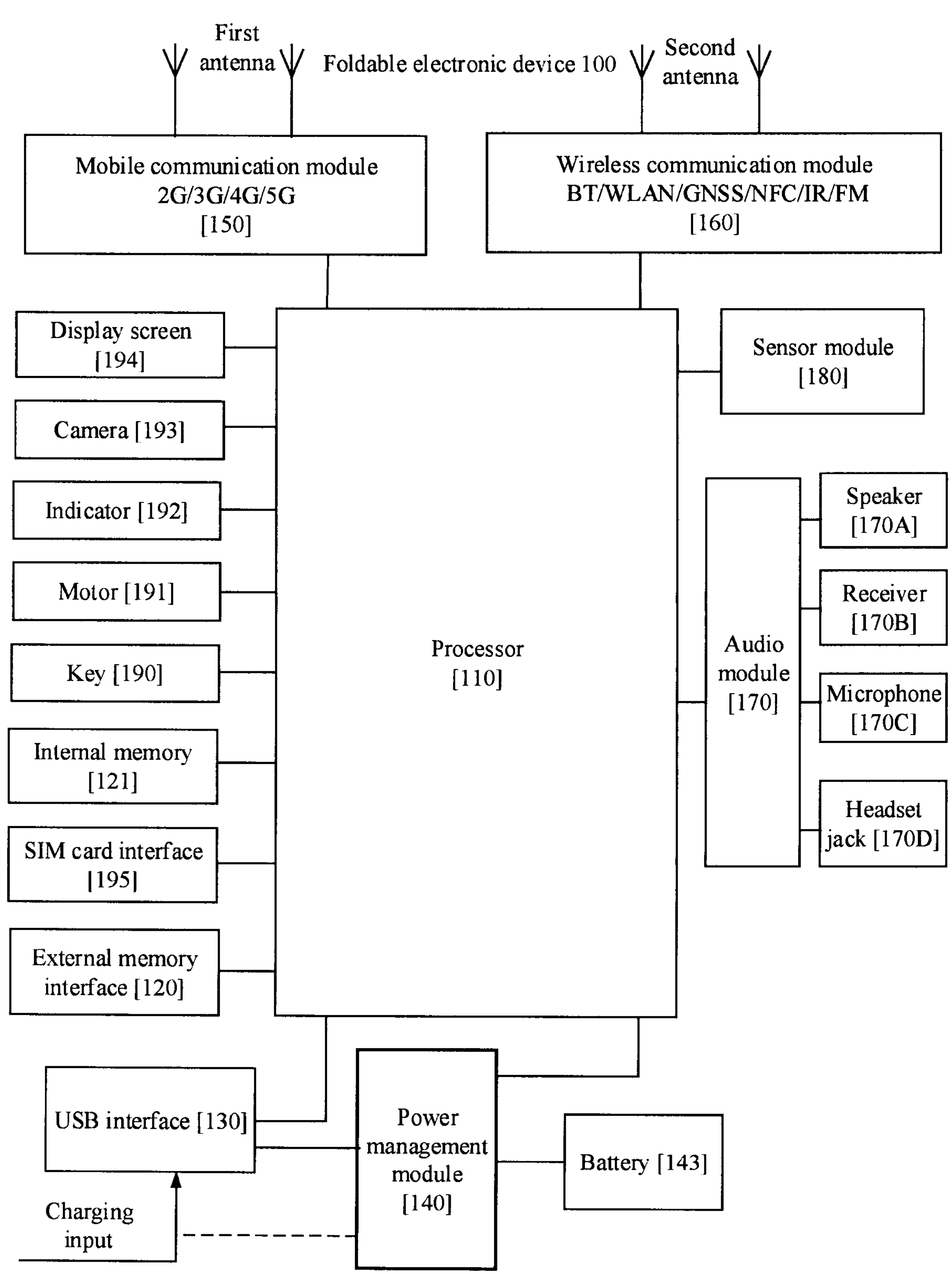
FIG. 5 is a schematic diagram of a hardware system structure of a foldable electronic device according to an embodiment of this application.

For example, FIG. 5 is a schematic diagram of a structure of a foldable electronic device 100 according to an embodiment of this application. The foldable electronic device 100 may include a processor 110, an external memory interface 120, an internal memory 121, a USB interface 130, a power management module 140, a battery 143, a first antenna, a second antenna, a mobile communication module 150, a wireless communication module 160, an audio module 170, a speaker 170A, a receiver 170B, a microphone 170C, a headset jack 170D, a sensor module 180, a key 190, a motor 191, an indicator 192, a camera 193, a display screen 194, a subscriber identity module (subscriber identification module, SIM) card interface 195, and the like. The sensor module 180 may include a pressure sensor, a gyroscope sensor, a barometric pressure sensor, a magnetic sensor, an acceleration sensor, a distance sensor, an optical proximity sensor, a fingerprint sensor, a temperature sensor, a touch sensor, an ambient light sensor, a bone conduction sensor, and the like.

It may be understood that the structure shown in this embodiment of this application constitutes no specific limitation on the foldable electronic device 100. In some other embodiments of this application, the foldable electronic device 100 may include more or fewer parts than those shown in the figure, some parts may be combined, some parts may be split, or there may be a different part arrangement. The parts shown in the figure may be implemented by hardware, software, or a combination of software and hardware.

The processor 110 may include one or more processing units. For example, the processor 110 may include a system on chip (system on chip, SOC) processor, an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). Different processing units may be independent devices, or may be integrated into one or more processors.

The controller may generate an operation control signal based on instruction operation code and a timing signal, to complete control of instruction fetching and instruction execution.

A memory may be further disposed in the processor 110, and is configured to store instructions and data. In some embodiments, the memory in the processor 110 is a cache memory. The memory may store instructions or data recently used or cyclically used by the processor 110. If the processor 110 needs to use the instructions or the data again, the processor 110 may invoke the instructions or the data from the memory. This avoids repeated access and reduces a waiting time of the processor 110, thereby improving system efficiency.

In some embodiments, the processor 110 may include one or more interfaces. The interface may include an inter-integrated circuit (inter-integrated circuit, I2C) interface, an inter-integrated circuit sound (inter-integrated circuitsound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a USB interface, and/or the like.

The power management module 140 is configured to receive a charging input from a charger. The charger may be a wireless charger or a wired charger. In some embodiments of wired charging, the power management module 140 may receive a charging input from a wired charger through the USB interface 130. In some embodiments of wireless charging, the power management module 140 may receive a wireless charging input through a wireless charging coil of the foldable electronic device 100.

The power management module 140 may further supply power to the foldable electronic device 100 while charging the battery 143. The power management module 140 is configured to be connected to the battery 143 and the processor 110. When the foldable electronic device 100 is not connected to a charger, the power management module 140 receives an input from the battery 143, and supplies power to the processor 110, the internal memory 121, the display screen 194, the camera 193, the wireless communication module 160, and the like. The power management module 140 may be further configured to monitor parameters such as a battery capacity, a quantity of battery cycles, and a state of health (leakage or impedance) of the battery. In some other embodiments, the power management module 140 may alternatively be disposed in the processor 110.

In this embodiment of this application, the foldable electronic device 100 includes two power management modules: a first power management module and a second power management module, the first power management module is located in a first foldable portion 11, and the second power management module is located in a second foldable portion 12.

In addition, a first battery pack is further disposed in the first foldable portion 11, and the first battery pack includes at least one battery 143; and a second battery pack is further disposed in the second foldable portion 12, and the second battery pack also includes at least one battery 143.

A wireless communication function of the foldable electronic device 100 may be implemented by using the first antenna, the second antenna, the mobile communication module 150, the wireless communication module 160, the modem processor, the baseband processor, and the like.

The foldable electronic device 100 implements a display function by using the GPU, the display screen 194, the application processor, and the like. The GPU is a microprocessor for image processing and is connected to the display screen 194 and the application processor. The GPU is configured to perform mathematical and geometric computing for graphics rendering. The processor 110 may include one or more GPUs, and the one or more GPUs execute program instructions to generate or change displayed information. The display screen 194 is configured to display an image, display a video, receive a slide operation, and so on. The display screen 194 may be a flexible screen 20.

The foldable electronic device 100 may implement a photographing function by using the ISP, the camera 193, the video codec, the GPU, the display screen 194, the application processor, and the like.

The camera 193 is configured to capture a still image or a video. An optical image is generated for an object through a lens and is projected onto a photosensitive element. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format, for example, RGB or YUV. In some embodiments, the foldable electronic device 100 may include one or N cameras 193, where N is a positive integer greater than 1.

The external memory interface 120 may be configured to be connected to an external memory card, for example, a Micro SD card, to expand a storage capability of the foldable electronic device 100. The external memory card communicates with the processor 110 through the external memory interface 120, to implement a data storage function, for example, to store files such as music and a video in the external memory card.

The internal memory 121 may be configured to store computer-executable program code, and the executable program code includes instructions. The internal memory 121 may include a program storage region and a data storage region. The program storage region may store an operating system, an application required by at least one function (for example, a sound playing function or an image playing function), and the like. The data storage region may store data (for example, audio data and a phone book) created during use of the foldable electronic device 100. In addition, the internal memory 121 may include a high-speed random access memory, and may further include a nonvolatile memory, for example, at least one magnetic disk storage device, a flash memory device, or a universal flash storage (universal flash storage, UFS). The processor 110 performs various function applications and data processing of the foldable electronic device 100 by running the instructions stored in the internal memory 121 and/or instructions stored in the memory disposed in the processor.

The foldable electronic device 100 may implement an audio function by using the audio module 170, the speaker 170A, the receiver 170B, the microphone 170C, the headset jack 170D, the application processor, and the like, for example, implement music playing and audio recording.

The key 190 includes a power on/off key, a volume key, and the like. The key 190 may be a mechanical key, or may be a touch key. The foldable electronic device 100 may receive a key input and generate a key signal input related to user settings and function control of the foldable electronic device 100.

The motor 191 may generate a vibration prompt. The motor 191 may be configured to provide a vibration prompt for an incoming call, and may be further configured to provide vibration feedback for a touch. The indicator 192 may be an indicator light, may be configured to indicate a charging status or a power change, and may be further configured to indicate a message, a missed incoming call, a notification, and the like.

The SIM card interface 195 is configured to be connected to a SIM card. The SIM card may be inserted into the SIM card interface 195 or removed from the SIM card interface 195 to implement contact with and separation from the foldable electronic device 100. The foldable electronic device 100 may support one or N SIM card interfaces, where N is a positive integer greater than 1.

The following describes, in detail by using specific embodiments, the technical solutions of this application and how the foregoing technical problems are resolved by using the technical solutions of this application. The following several specific embodiments may be implemented independently, or may be combined with each other. For same or similar concepts or processes, details may not be described in some embodiments.

In the following embodiments, descriptions may be provided by using an example in which one battery 143 is disposed in each of a first foldable portion 11 and a second foldable portion 12. Certainly, in the embodiments of this application, a quantity of batteries 143 disposed in the first foldable portion 11 and/or the second foldable portion 12 may be increased based on an actual requirement.

Figure 6:
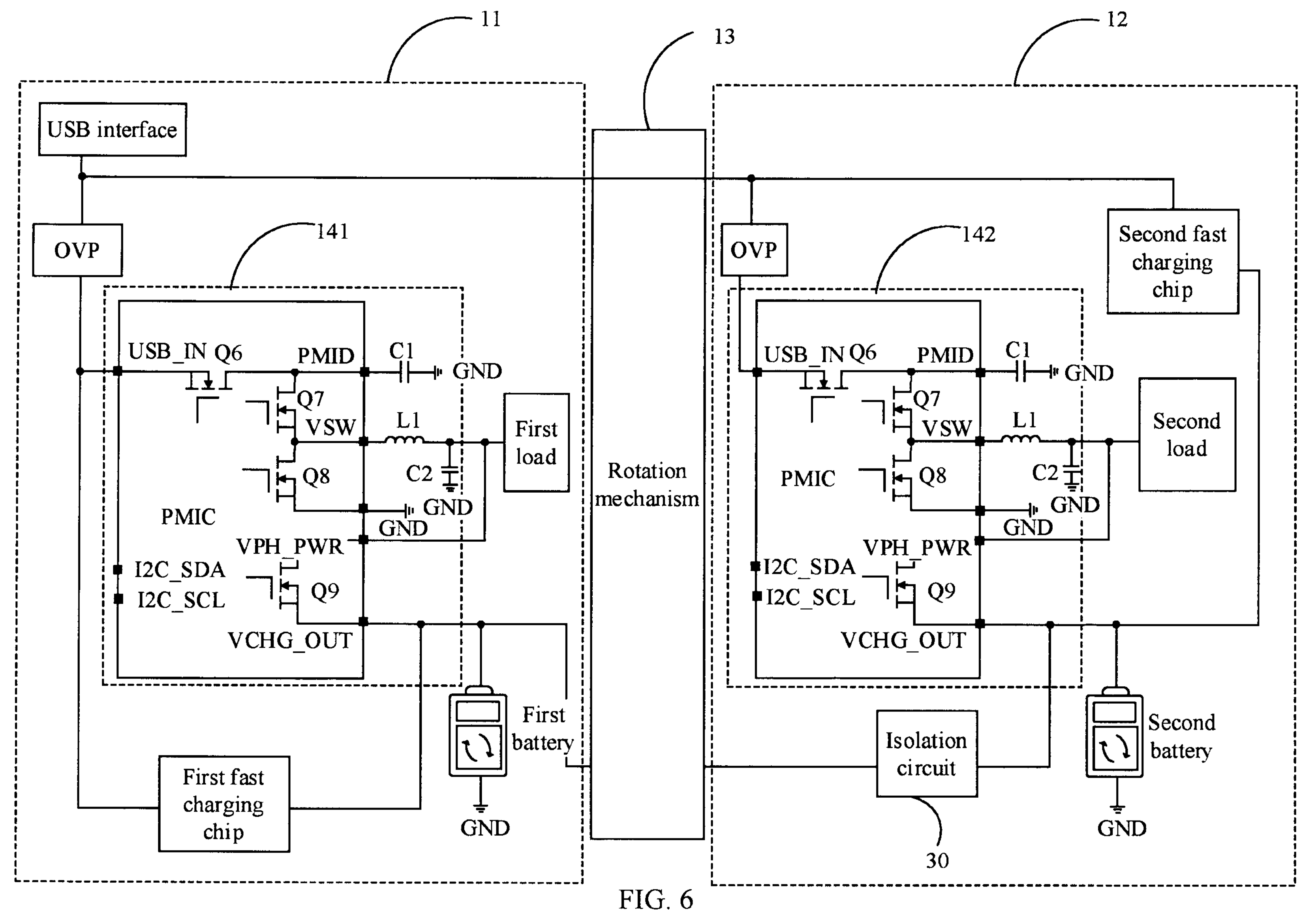
FIG. 6 is a schematic diagram of a circuit structure of a foldable electronic device according to an embodiment of this application.

For example, FIG. 6 is a schematic diagram of a circuit structure of a foldable electronic device according to an embodiment of this application. With reference to FIG. 6, the foldable electronic device 100 includes a first foldable portion 11, a second foldable portion 12, and a rotation mechanism 13 located between the first foldable portion 11 and the second foldable portion 12.

The first foldable portion 11 includes a first power management module 141, a first load, and a first battery pack. The first battery pack includes one battery, and the one battery included in the first battery pack may be referred to as a first battery. That is, all of the first power management module 141, the first load, and the first battery are located in the first foldable portion 11. The first power management module 141 is separately connected to the first battery and the first load. Specifically, the first power management module 141 is connected to a positive electrode of the first battery, and a negative electrode of the first battery is connected to a ground terminal GND.

The second foldable portion 12 includes a second power management module 142, a second load, and a second battery pack. The second battery pack includes one battery, and the one battery included in the second battery pack may be referred to as a second battery. That is, all of the second power management module 142, the second load, and the second battery are located in the second foldable portion 12. The second power management module 142 is separately connected to the second battery and the second load. Specifically, the second power management module 142 is connected to a positive electrode of the second battery, and a negative electrode of the second battery is connected to a ground terminal GND.

When the foldable electronic device 100 is in a discharged state, the first power management module 141 is configured to control the first battery to supply power to the first load. That is, a battery voltage provided by the first battery is transmitted to the first power management module 141, and the first power management module 141 converts the battery voltage into a system voltage, and provides the system voltage to the first load, to supply power to the first load.

Correspondingly, when the foldable electronic device 100 is in the discharged state, the second power management module 142 is configured to control the second battery to supply power to the second load. That is, a battery voltage provided by the second battery is transmitted to the second power management module 142, and the second power management module 142 converts the battery voltage into a system voltage, and provides the system voltage to the second load, to supply power to the second load.

In this way, a power transmission path existing when the first battery supplies power to the first load corresponds to a relatively short trace, and a power transmission path existing when the second battery supplies power to the second load also corresponds to a relatively short trace, to reduce a loss caused by trace impedance in the power transmission path. Correspondingly, a trace width in the power transmission path does not need to be increased, to improve reliability of the rotation mechanism 13 and reliability of a flexible screen 20 supported by the rotation mechanism 13.

In a production, maintenance, and use process of the first battery and the second battery in the foldable electronic device 100, there may be a relatively large voltage difference between the first battery and the second battery. When there is a relatively large voltage difference between the first battery and the second battery, if the first battery and the second battery are directly connected in parallel, a relatively high mutual charging current is prone to be generated between the first battery and the second battery, and consequently a trace distributed on an FPC is prone to be burnt.

Therefore, to reduce a possibility that the trace distributed on the FPC is burnt due to the mutual charging current generated between the first battery and the second battery, an isolation circuit 30 may be disposed between the first battery and the second battery to implement isolation, that is, the voltage difference between the first battery and the second battery is reduced based on the isolation circuit 30, to limit the mutual charging current between the first battery and the second battery.

As shown in FIG. 6, the foldable electronic device 100 further includes one isolation circuit 30, and the isolation circuit 30 is connected between the first battery and the second battery. Specifically, one end of the isolation circuit 30 is connected to the positive electrode of the first battery, and the other end of the isolation circuit 30 is connected to the positive electrode of the second battery.

The isolation circuit 30 is configured to perform voltage balancing on the first battery and the second battery that are connected to the isolation circuit 30. Specifically, the isolation circuit 30 may change impedance in a path between the first battery and the second battery, to reduce the voltage difference between the first battery and the second battery.

In this embodiment of this application, the isolation circuit 30 may be located in the second foldable portion 12, or certainly, the isolation circuit 30 may be disposed in the first foldable portion 11 based on an actual product layout, that is, the isolation circuit 30 may be located in the first foldable portion 11 or the second foldable portion 12.

In some implementations, the foldable electronic device 100 further includes an electrical parameter detection module (not shown in FIG. 6) and a processor 110 (not shown in FIG. 6). The processor 110 may be a SOC processor, and the processor 110 and the isolation circuit 30 are two different parts. In addition, the isolation circuit 30 includes an isolation module (not shown in FIG. 6), and the processor 110 is separately connected to the electrical parameter detection module and the isolation module in the isolation circuit 30.

The electrical parameter detection module is configured to detect an electrical parameter related to the first battery and the second battery. The electrical parameter includes a voltage of the first battery and a voltage of the second battery, or the electrical parameter includes a current flowing through the isolation module. The electrical parameter detection module may send the detected electrical parameter to the processor 110, and the processor 110 is configured to control a working status of the isolation module in the isolation circuit 30 based on the electrical parameter. The working status of the isolation module includes any one of an on state, a balanced state, and an off state.

When the isolation module in the isolation circuit 30 is in the on state, the path between the first battery and the second battery is connected. In this case, when the foldable electronic device 100 is in a charged state, a charger charges the first battery and supplies power to the first load through a USB interface and the first power management module 141, and the charger charges the second battery and supplies power to the second load through the USB interface and the second power management module 142; and when the foldable electronic device 100 is in the discharged state, the first battery supplies power to the first load through the first power management module 141, and the second battery supplies power to the second load through the second power management module 142.

When the isolation module in the isolation circuit 30 is in the balanced state, specific impedance is formed in the path between the first battery and the second battery, and the impedance formed in the path between the first battery and the second battery is adjustable, to implement voltage balancing between the first battery and the second battery, so as to reduce the voltage difference between the first battery and the second battery. In this way, the mutual charging current generated between the first battery and the second battery may be reduced, to reduce a possibility that the trace distributed on the FPC is burnt.

When the isolation module in the isolation circuit 30 is in the off state, the path between the first battery and the second battery is disconnected, and there is no mutual charging current between the first battery and the second battery.

In a case, the electrical parameter detection module includes a first voltage detection element and a second voltage detection element, the first voltage detection element is connected to the first battery, and the second voltage detection element is connected to the second battery. The first voltage detection element is configured to detect the voltage of the first battery, and the second voltage detection element is configured to detect the voltage of the second battery, that is, the electrical parameter includes the voltage of the first battery and the voltage of the second battery.

The first voltage detection element may send the detected voltage of the first battery to the processor 110, and the second voltage detection element sends the detected voltage of the second battery to the processor 110. The processor 110 is configured to: calculate the voltage difference between the first battery and the second battery, and control the working status of the isolation module in the isolation circuit 30 based on the voltage difference between the first battery and the second battery. The voltage difference between the first battery and the second battery may be an absolute value of a difference between the voltage of the first battery and the voltage of the second battery.

In an actual product, the first voltage detection element may be integrated into the first power management module 141, or the first voltage detection element may be integrated into the isolation circuit 30, or the first voltage detection element may be separately disposed from both the first power management module 141 and the isolation circuit 30. Correspondingly, the second voltage detection element may be integrated into the second power management module 142, or the second voltage detection element may be integrated into the isolation circuit 30, or the second voltage detection element may be separately disposed from both the second power management module 142 and the isolation circuit 30.

In another case, the electrical parameter detection module includes a current detection element, and the current detection element is connected to the path between the first battery and the second battery. Specifically, the current detection element is connected in series to the path between the first battery and the second battery. The current detection element is configured to detect the current flowing through the isolation module in the isolation circuit 30, that is, the electrical parameter includes the current flowing through the isolation module.

The current detection element may send the detected current flowing through the isolation module to the processor 110, and the processor 110 is configured to control the working status of the isolation module based on the current flowing through the isolation module.

In an actual product, the current detection element may be integrated into the isolation circuit 30, or the current detection element may be separately disposed from the isolation circuit 30.

In some other embodiments, the foldable electronic device 100 further includes an electrical parameter detection module, the isolation circuit 30 includes an isolation module and a first control unit, and the first control unit is separately connected to the electrical parameter detection module and the isolation module.

The electrical parameter detection module is configured to detect an electrical parameter related to the first battery and the second battery. The electrical parameter includes a voltage of the first battery and a voltage of the second battery, or the electrical parameter includes a current flowing through the isolation module. The electrical parameter detection module may send the detected electrical parameter to the first control unit, and the first control unit is configured to control a working status of the isolation module in the isolation circuit 30 based on the electrical parameter. The working status of the isolation module includes any one of an on state, a balanced state, and an off state.

In a case, the electrical parameter detection module includes a first voltage detection element and a second voltage detection element, the first voltage detection element is connected to the first battery, and the second voltage detection element is connected to the second battery. The first voltage detection element is configured to detect the voltage of the first battery, and the second voltage detection element is configured to detect the voltage of the second battery, that is, the electrical parameter includes the voltage of the first battery and the voltage of the second battery.

The first voltage detection element may send the detected voltage of the first battery to the first control unit, and the second voltage detection element sends the detected voltage of the second battery to the first control unit. The first control unit is configured to: calculate the voltage difference between the first battery and the second battery, and control the working status of the isolation module based on the voltage difference between the first battery and the second battery.

In another case, the electrical parameter detection module includes a current detection element, and the current detection element is connected to the path between the first battery and the second battery. Specifically, the current detection element is connected in series to the path between the first battery and the second battery. The current detection element is configured to detect the current flowing through the isolation module in the isolation circuit 30, that is, the electrical parameter includes the current flowing through the isolation module.

The current detection element may send the detected current flowing through the isolation module to the first control unit, and the first control unit is configured to control the working status of the isolation module based on the current flowing through the isolation module.

The working status of the isolation module in the isolation circuit 30 may be controlled by using the processor 110 separately disposed from the isolation circuit 30, or the working status of the isolation module in the isolation circuit 30 may be actively controlled by using the first control unit disposed in the isolation circuit 30. The processor 110 and the first control unit in the isolation circuit 30 may be referred to as processing modules.

For example, the electrical parameter detection module may control the working status of the isolation module in the isolation circuit 30 according to the following rule.

The isolation module in the isolation circuit 30 is in the off state by default. For example, when the foldable electronic device 100 is in a powered-off state, the isolation module in the isolation circuit 30 is in the off state, and the path between the first battery and the second battery is disconnected.

When the foldable electronic device 100 is in the powered-off state, if the isolation module is not in the off state, in some actual scenarios, a maintenance person may replace one of the batteries when the foldable electronic device 100 is in the powered-off state. A power level of a battery obtained after replacement may be different from that of an unreplaced battery, and consequently the two batteries with different power levels are connected together. If there is a relatively large power level difference between the battery obtained after replacement and the unreplaced battery, there is a relatively large voltage difference between the battery obtained after replacement and the unreplaced battery, and consequently the trace distributed on the FPC is prone to be burnt. For example, if the first battery is faulty, and the foldable electronic device 100 is in the powered-off state, the first battery may be replaced. If a voltage of a first battery obtained after replacement is greater than the voltage of the unreplaced second battery, and there is a relatively large voltage difference between the first battery obtained after replacement and the unreplaced second battery, a specific current of the first battery obtained after replacement flows to the unreplaced second battery, and power is supplied to the unreplaced second battery. This may cause the trace distributed on the FPC to be burnt.

Therefore, in this embodiment of this application, when the foldable electronic device 100 is in the powered-off state, the isolation module is in the off state, so that when the foldable electronic device 100 is in the powered-off state, one of the batteries is replaced, and a connection between a battery obtained after replacement and an unreplaced battery is broken, to reduce a possibility that the trace distributed on the FPC is burnt.

When the foldable electronic device 100 is ready to be powered on, if a user presses a power on/off key disposed on the foldable electronic device 100 to request power-on, the isolation module in the isolation circuit 30 is still in the off state by default. In addition, the first voltage detection element may detect the voltage of the first battery and send the voltage to the processor 110 (or the first control unit), the second voltage detection element may detect the voltage of the second battery and send the voltage to the processor 110 (or the first control unit), and the processor 110 (or the first control unit) calculates the voltage difference between the first battery and the second battery, and compares the voltage difference with a preset voltage.

If the voltage difference between the first battery and the second battery is less than or equal to the preset voltage, the foldable electronic device 100 is normally powered on. If the voltage difference between the first battery and the second battery is greater than the preset voltage, it needs to be determined, in this case, whether the foldable electronic device 100 is in the charged state or in the discharged state.

In a case, when the voltage difference between the first battery and the second battery is greater than the preset voltage, and the foldable electronic device 100 is in the charged state, the processor 110 determines a value relationship between the voltage of the first battery and the voltage of the second battery, and the processor 110 controls a power management module connected to a battery with a relatively low voltage to charge the battery with a relatively low voltage, and controls a power management module connected to a battery with a relatively high voltage not to charge the battery with a relatively high voltage until the voltage difference between the first battery and the second battery is less than or equal to the preset voltage. After voltage balancing is performed on the first battery and the second battery by using the power management module connected to the battery with a relatively low voltage, the processor 110 may control the isolation module in the isolation circuit 30 to be in the on state, and start to control the power management module connected to the battery with an originally relatively high voltage to start to charge the battery with an originally relatively high voltage. In addition, when the voltage difference between the first battery and the second battery is less than or equal to the preset voltage, the foldable electronic device 100 is normally powered on.

For example, when the processor 110 determines that the voltage difference between the first battery and the second battery is greater than the preset voltage, and the voltage of the first battery is greater than the voltage of the second battery, the processor 110 controls the second power management module 142 to charge the second battery, and controls the first power management module 141 not to charge the first battery until the voltage difference between the first battery and the second battery is less than or equal to the preset voltage. After voltage balancing is performed on the first battery and the second battery by using the second power management module 142, the processor 110 may control the isolation module in the isolation circuit 30 to be in the on state, and the processor 110 starts to control the first power management module 141 to charge the first battery.

Certainly, the first control unit in the isolation circuit 30 may alternatively detect a value relationship between the voltage of the first battery and the voltage of the second battery, and after determining the value relationship between the voltage of the first battery and the voltage of the second battery, send a corresponding signal to the processor 110, to notify the processor 110 that a battery with a relatively low voltage is the first battery or the second battery. The processor 110 controls a power management module connected to the battery with a relatively low voltage to charge the battery with a relatively low voltage, and controls a power management module connected to a battery with a relatively high voltage not to charge the battery with a relatively high voltage until the first control unit determines that the voltage difference between the first battery and the second battery is less than or equal to the preset voltage. After voltage balancing is performed on the first battery and the second battery by using the power management module connected to the battery with a relatively low voltage, the first control unit in the isolation circuit 30 may control the isolation module in the isolation circuit 30 to be in the on state. In addition, when the first control unit determines that the voltage difference between the first battery and the second battery is balanced to be less than or equal to the preset voltage, the first control unit sends the corresponding signal to the processor 110 again, so that the processor 110 starts to control the power management module connected to the battery with an originally relatively high voltage to start to charge the battery with an originally relatively high voltage.

In another case, when the voltage difference between the first battery and the second battery is greater than the preset voltage, and the foldable electronic device 100 is in the discharged state, the processor 110 (or the first control unit) controls the isolation module to be in the balanced state, to adjust the impedance formed in the path between the first battery and the second battery, so as to reduce the voltage difference between the first battery and the second battery, and implement voltage balancing between the first battery and the second battery. When the voltage difference between the first battery and the second battery is reduced to be less than or equal to the preset voltage, the processor 110 (or the first control unit) may control the isolation module to change from the balanced state to the on state. In addition, when the voltage difference between the first battery and the second battery is less than or equal to the preset voltage, the foldable electronic device 100 is normally powered on.

After the foldable electronic device 100 is powered on, the processor 110 (or the first control unit) still obtains the voltage of the first battery detected by the first voltage detection element and the voltage of the second battery detected by the second voltage detection element, and compares the calculated voltage difference between the first battery and the second battery with the preset voltage.

In a scenario in which the foldable electronic device 100 is in the discharged state, if the voltage difference between the first battery and the second battery is less than or equal to the preset voltage, the processor 110 (or the first control unit) controls the isolation module to be in the on state, so that the first battery and the second battery are discharged in parallel, that is, the first battery supplies power to the first load through the first power management module 141, and the second battery supplies power to the second load through the second power management module 142. If the voltage difference between the first battery and the second battery is greater than the preset voltage, the processor 110 (or the first control unit) controls the isolation module to be in the balanced state, to perform voltage balancing between the first battery and the second battery. When the voltage difference between the first battery and the second battery is balanced to be less than or equal to the preset voltage, the processor 110 (or the first control unit) again controls the isolation module to be in the on state.

In a scenario in which the foldable electronic device 100 is in the charged state, if the voltage difference between the first battery and the second battery is less than or equal to the preset voltage, the processor 110 (or the first control unit) controls the isolation module to be in the on state, so that the first battery and the second battery are charged in parallel, that is, the charger charges the first battery through the USB interface and the first power management module 141, and the charger charges the second battery through the USB interface and the second power management module 142. If the voltage difference between the first battery and the second battery is greater than the preset voltage, the processor 110 (or the first control unit) controls the isolation module to be in the off state, and the processor 110 controls a power management module connected to a battery with a relatively low voltage to charge the battery with a relatively low voltage, and controls a power management module connected to a battery with a relatively high voltage to stop charging the battery with a relatively high voltage until the voltage difference between the first battery and the second battery is less than or equal to the preset voltage. After voltage balancing is performed on the first battery and the second battery by using the power management module connected to the battery with a relatively low voltage, the processor 110 (or the first control unit) may control the isolation module in the isolation circuit 30 to be in the on state, and control the power management module connected to the battery with a relatively high voltage to continue to charge the battery with an originally relatively high voltage.

Certainly, it may be understood that the foregoing case of controlling the status of the isolation module based on the voltage difference between the first battery and the second battery may be replaced with a case of controlling the status of the isolation module by using the current flowing through the isolation module.

In a scenario in which the foldable electronic device 100 is in the discharged state, the current detection element detects the current flowing through the isolation module, and sends the detected current flowing through the isolation module to the processor 110 (or the first control unit), and the processor 110 (or the first control unit) compares the current flowing through the isolation module with a preset current.

If the current flowing through the isolation module is less than or equal to the preset current, the processor 110 (or the first control unit) controls the isolation module to be in the on state, so that the first battery and the second battery are discharged in parallel. If the current flowing through the isolation module is greater than the preset current, the processor 110 (or the first control unit) controls the isolation module to be in the balanced state, to perform voltage balancing between the first battery and the second battery. When the voltage difference between the first battery and the second battery is balanced to be less than or equal to the preset voltage, the processor 110 (or the first control unit) again controls the isolation module to be in the on state.

In a scenario in which the foldable electronic device 100 is in the charged state, if the processor 110 (or the first control unit) determines that the current flowing through the isolation module is less than or equal to the preset current, the processor 110 (or the first control unit) controls the isolation module to be in the on state, so that the first battery and the second battery are charged in parallel. If the processor 110 (or the first control unit) determines that the current flowing through the isolation module is greater than the preset current, the processor 110 (or the first control unit) controls the isolation module to be in the off state, and the processor 110 controls, based on a current flow direction, a power management module connected to a battery with a relatively low voltage to charge the battery with a relatively low voltage, and controls a power management module connected to a battery with a relatively high voltage to stop charging the battery with a relatively high voltage until the current flowing through the isolation module is less than or equal to the preset current. After the current flowing through the isolation module is enabled, by using the power management module connected to the battery with a relatively low voltage, to be less than or equal to the preset current, the processor 110 (or the first control unit) may control the isolation module in the isolation circuit 30 to be in the on state, and control the power management module connected to the battery with an originally relatively high voltage to continue to charge the battery with an originally relatively high voltage.

In conclusion, the processor 110 (or the first control unit) may be configured to: when the foldable electronic device 100 is in the discharged state, and the electrical parameter does not meet the preset condition, control the isolation module to be in the balanced state, to perform voltage balancing on the voltage of the first battery and the voltage of the second battery. The processor 110 (or the first control unit) is further configured to: when the foldable electronic device 100 is in the charged state, and the electrical parameter does not meet the preset condition, control a power management module connected to a third target battery to charge the third target battery until the electrical parameter meets the preset condition. The third target battery is a battery with a lower voltage in the first battery and the second battery. When the voltage difference between the first battery and the second battery is greater than the preset voltage, the electrical parameter does not meet the preset condition; or when the current flowing through the isolation module is greater than the preset current, the electrical parameter does not meet the preset condition.

When the foldable electronic device 100 is in the discharged state or the charged state, the processor 110 (or the first control unit) is configured to: when the electrical parameter meets the preset condition, control the isolation module to be in the on state, so that the first battery and the second battery are discharged in parallel, or the first battery and the second battery are charged in parallel. When the voltage difference between the first battery and the second battery is less than or equal to the preset voltage, the electrical parameter meets the preset condition; or when the current flowing through the isolation module is less than or equal to the preset current, the electrical parameter meets the preset condition.

In addition, in an actual use process, there is further a case in which the first battery and the second battery are over-discharged. In this case, each of the first battery and the second battery has an excessively low voltage, which cannot ensure normal power-on of the foldable electronic device 100. Therefore, in a scenario in which the first battery and the second battery are over-discharged, when the foldable electronic device 100 is ready to be powered on and the foldable electronic device 100 is in the charged state, the processor 110 may obtain the voltage of the first battery and the voltage of the second battery, and when both the voltage of the first battery and the voltage of the second battery are less than a preset power-on threshold (for example, the preset power-on threshold is 3 V), and the voltage of the first battery is greater than the voltage of the second battery, the processor 110 controls the first power management module 141 to charge the first battery, and in this case, the second power management module 142 stops charging the second battery. When the voltage of the first battery is charged to be greater than or equal to the preset power-on threshold, the foregoing voltage balancing process performed when the foldable electronic device 100 is ready to be powered on is performed. Details are not described herein.

The following describes a specific circuit structure and working principle of the isolation circuit 30 with reference to five different isolation circuits 30 shown in FIG. 7 to FIG. 11.

Figure 7:
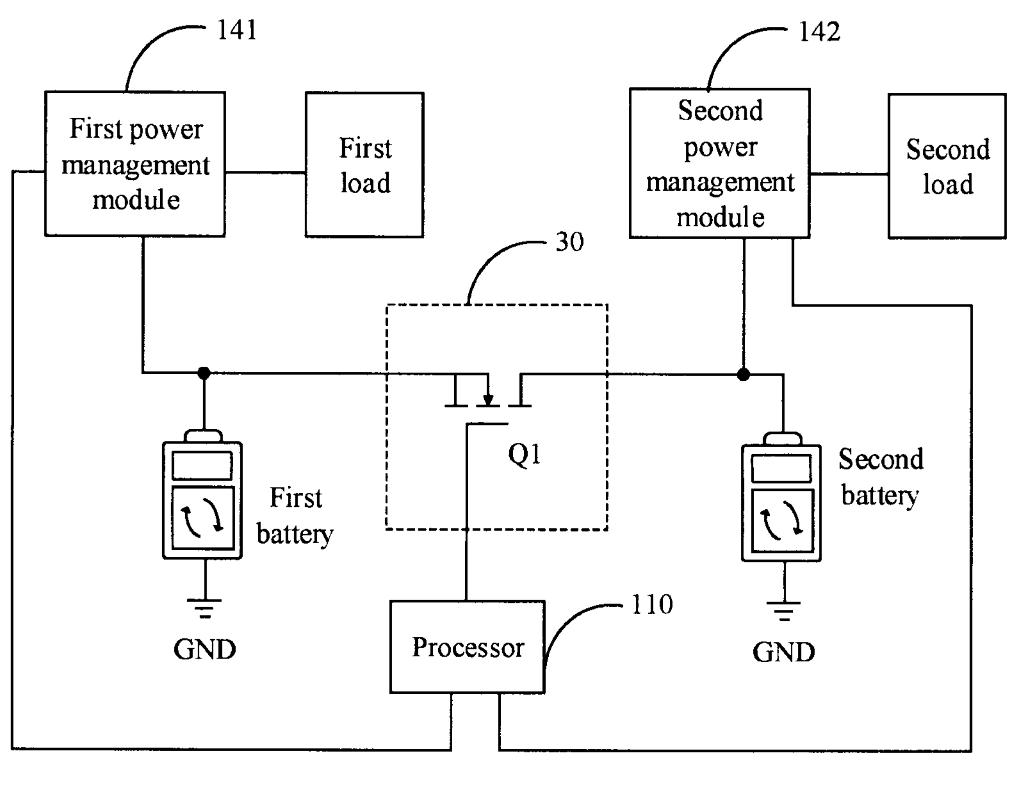
FIG. 7 is a circuit diagram of a first isolation circuit according to an embodiment of this application.

As shown in FIG. 7, the isolation circuit 30 includes only an isolation module, and the isolation module includes a first switch element Q1. A control terminal of the first switch element Q1 is connected to the processor 110, a first terminal of the first switch element Q1 is connected to the positive electrode of the first battery, and a second terminal of the first switch element Q1 is connected to the positive electrode of the second battery.

In a case, when the foldable electronic device 100 is in the discharged state, and when the processor 110 determines that the voltage difference between the first battery and the second battery is greater than the preset voltage, the processor 110 controls the first switch element Q1 to work in a linear region, so that the isolation module is in a balanced state; or when the processor 110 determines that the voltage difference between the first battery and the second battery is less than or equal to the preset voltage, the processor 110 controls the first switch element Q1 to work in a saturation region, so that the isolation module is in an on state.

Alternatively, when the foldable electronic device 100 is in the discharged state, and when the processor 110 determines that a current flowing through the first terminal and the second terminal of the first switch element Q1 is greater than the preset current, the processor 110 controls the first switch element Q1 to work in a linear region, so that the isolation module is in a balanced state; or when the processor 110 determines that a current flowing through the first terminal and the second terminal of the first switch element Q1 is less than or equal to the preset current, the processor 110 controls the first switch element Q1 to work in a saturation region, so that the isolation module is in an on state.

In another case, when the foldable electronic device 100 is in the charged state, and when the processor 110 determines that the voltage difference between the first battery and the second battery is greater than the preset voltage, the processor 110 controls a corresponding power management module to perform voltage balancing, and in this case, the processor 110 controls the first switch element Q1 to work in a cut-off region, that is, the isolation module is in an off state in this case; or when the processor 110 determines that the voltage difference between the first battery and the second battery is less than or equal to the preset voltage, the processor 110 controls the first switch element Q1 to work in a saturation region, so that the isolation module is in an on state.

Alternatively, when the foldable electronic device 100 is in the charged state, and when the processor 110 determines that a current flowing through the first terminal and the second terminal of the first switch element Q1 is greater than the preset current, the processor 110 controls a corresponding power management module to perform voltage balancing, and in this case, the processor 110 controls the first switch element Q1 to work in a cut-off region, that is, the isolation module is in an off state in this case; or when the processor 110 determines that a current flowing through the first terminal and the second terminal of the first switch element Q1 is less than or equal to the preset current, the processor 110 controls the first switch element Q1 to work in a saturation region, so that the isolation module is in an on state.

Specifically, the processor 110 may control, by controlling a duty ratio of a control signal provided to the control terminal of the first switch element Q1, the first switch element Q1 to separately work in the cut-off region, the linear region, and the saturation region. The duty ratio refers to a time proportion of a high-level pulse in a pulse period to the entire pulse period. For example, a duty ratio of a control signal in which a 1-second high-level pulse and a 1-second low-level pulse alternate is 50%. When the duty ratio of the control signal is 100%, that is, when the control signal is a continuous high-level signal, the first switch element Q1 works in the saturation region. When the duty ratio of the control signal is less than or equal to a specific value (for example, 35%), the first switch element Q1 works in the cut-off region. When the duty ratio of the control signal is greater than a specific value (for example, 35%) and is less than 100%, the first switch element Q1 works in the linear region.

Figure 8:
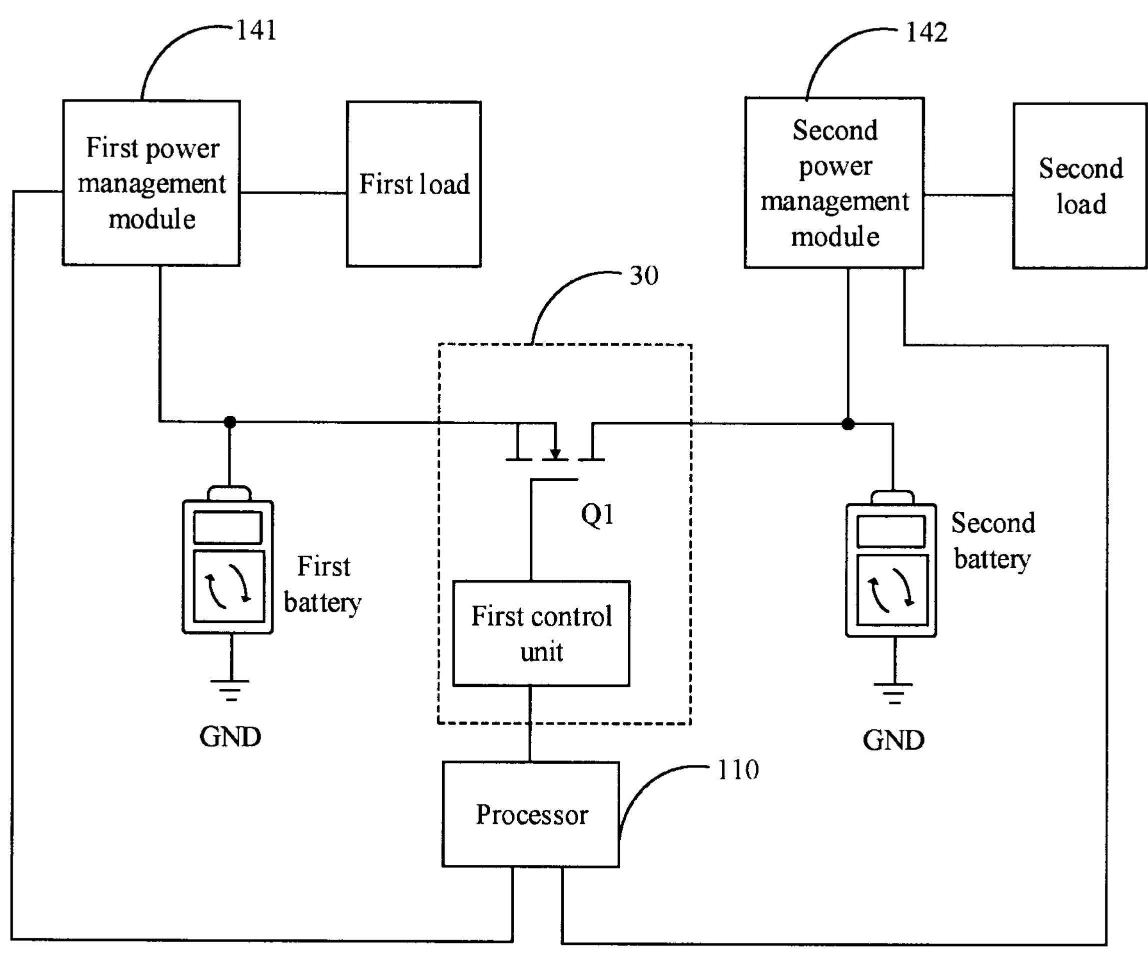
FIG. 8 is a circuit diagram of a second isolation circuit according to an embodiment of this application.

As shown in FIG. 8, the isolation circuit 30 includes a first control unit and an isolation module, and the isolation module includes a first switch element Q1. A control terminal of the first switch element Q1 is connected to the first control unit, a first terminal of the first switch element Q1 is connected to the positive electrode of the first battery, and a second terminal of the first switch element Q1 is connected to the positive electrode of the second battery. The first control unit may be further connected to the processor 110.

It should be noted that a difference between the isolation circuit 30 shown in FIG. 8 and the isolation circuit 30 shown in FIG. 7 lies in that the control terminal of the first switch element Q1 in the isolation circuit 30 shown in FIG. 7 is connected to the processor 110, and the processor 110 controls a working status of the first switch element Q1 by using the control signal sent by the processor 110, whereas the first control unit is further disposed in the isolation circuit 30 shown in FIG. 8, the control terminal of the first switch element Q1 is connected to the first control unit, and the first control unit controls a working status of the first switch element Q1 by using a control signal sent by the first control unit. A specific implementation process in which the first control unit controls the working status of the first switch element Q1 is similar to a specific implementation process in which the processor 110 controls the working status of the first switch element Q1. To avoid repetition, details are not described herein.

In addition, the control signal provided to the control terminal of the first switch element Q1 may be a pulse width modulation (pulse width modulation, PWM) signal. Therefore, in the isolation circuit 30 shown in FIG. 8, a control signal generator may be further disposed, and the control signal generator is configured to generate the PWM signal.

The first switch element Q1 may be a metal-oxide-semiconductor (metal-oxide-semiconductor, MOS) transistor or another switching device. For example, the first switch element Q1 may be an NMOS transistor. Specifically, the control terminal of the first switch element Q1 is a gate of the first switch element Q1, the first terminal of the first switch element Q1 is a source of the first switch element Q1, and the second terminal of the first switch element Q1 is a drain of the first switch element Q1.

Figure 9:
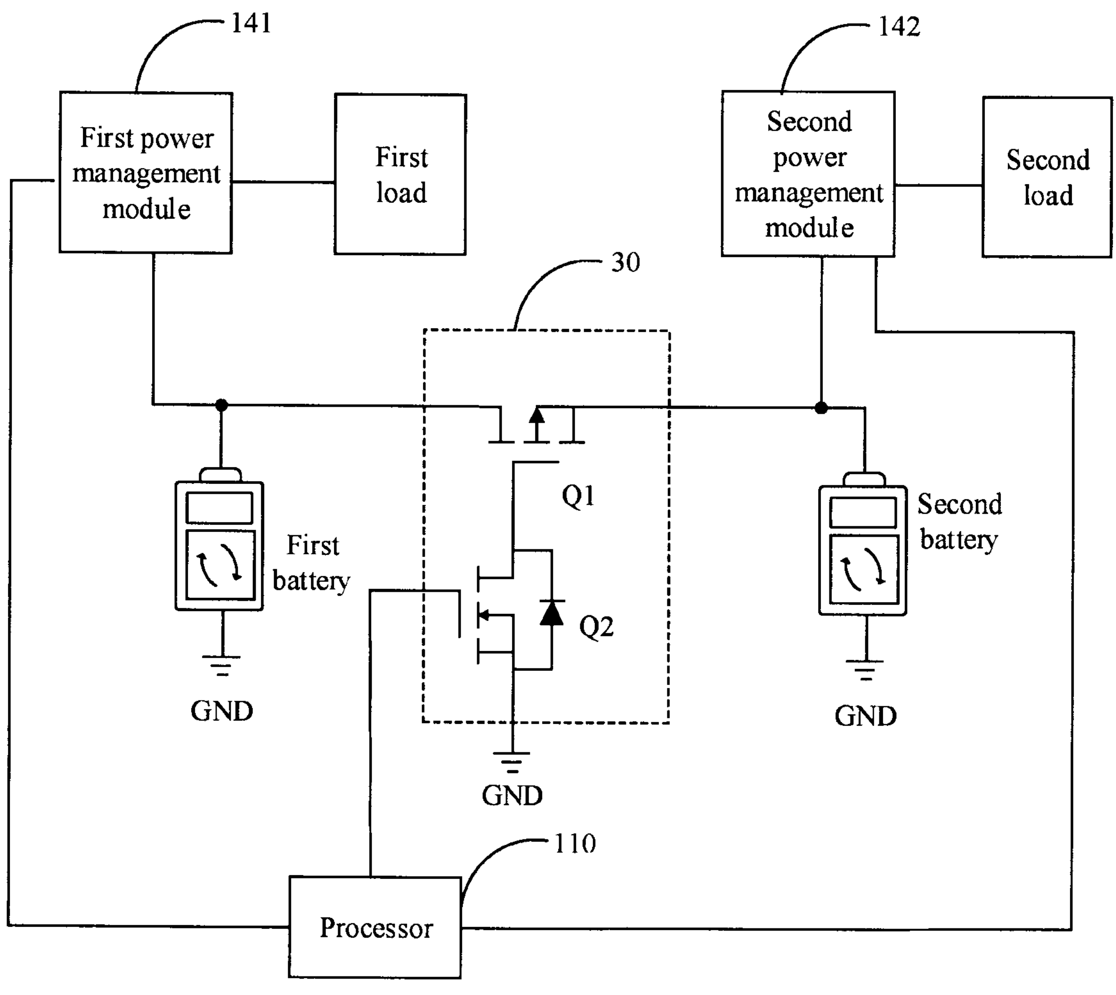
FIG. 9 is a circuit diagram of a third isolation circuit according to an embodiment of this application.

As shown in FIG. 9, the isolation circuit 30 includes only an isolation module, and the isolation module includes a first switch element Q1 and a second switch element Q2. A control terminal of the first switch element Q1 is connected to a first terminal of the second switch element Q2, a first terminal of the first switch element Q1 is connected to the positive electrode of the first battery, and a second terminal of the first switch element Q1 is connected to the positive electrode of the second battery. A control terminal of the second switch element Q2 is connected to the processor 110, and a second terminal of the second switch element Q2 is connected to a ground terminal GND.

A difference between the isolation circuit shown in FIG. 9 and the isolation circuit shown in FIG. 7 lies in that the first switch element Q1 in the isolation circuit shown in FIG. 9 is implemented by a PMOS transistor, and the second switch element Q2 is added. The second switch element Q2 may be implemented by an NMOS transistor with a parasitic diode, and a working status of the first switch element Q1 is controlled by using the second switch element Q2.

The control terminal of the first switch element Q1 is a gate of the first switch element Q1, the first terminal of the first switch element Q1 may be a drain of the first switch element Q1, and the second terminal of the first switch element Q1 may be a source of the first switch element Q1. The control terminal of the second switch element Q2 is a gate of the second switch element Q2, the first terminal of the second switch element Q2 is a drain of the second switch element Q2, and the second terminal of the second switch element Q2 is a source of the second switch element Q2.

Specifically, the processor 110 may control, by controlling a duty ratio of a control signal provided to the control terminal of the second switch element Q2, the second switch element Q2 to separately work in a cut-off region, a linear region, and a saturation region. When the second switch element Q2 works in the cut-off region, the first switch element Q1 also works in the cut-off region, so that the isolation module is in an off state. When the second switch element Q2 works in the linear region, the first switch element Q1 also works in the linear region, so that the isolation module is in a balanced state. When the second switch element Q2 works in the saturation region, the first switch element Q1 also works in the saturation region, so that the isolation module is in an on state.

Certainly, in this embodiment of this application, a first control unit may alternatively be disposed in the isolation circuit 30, the first control unit is used to replace the processor 110, and a control signal is provided to the second switch element Q2 based on the first control unit, to control the second switch element Q2 to separately work in the cut-off region, the linear region, and the saturation region.

Figure 10:
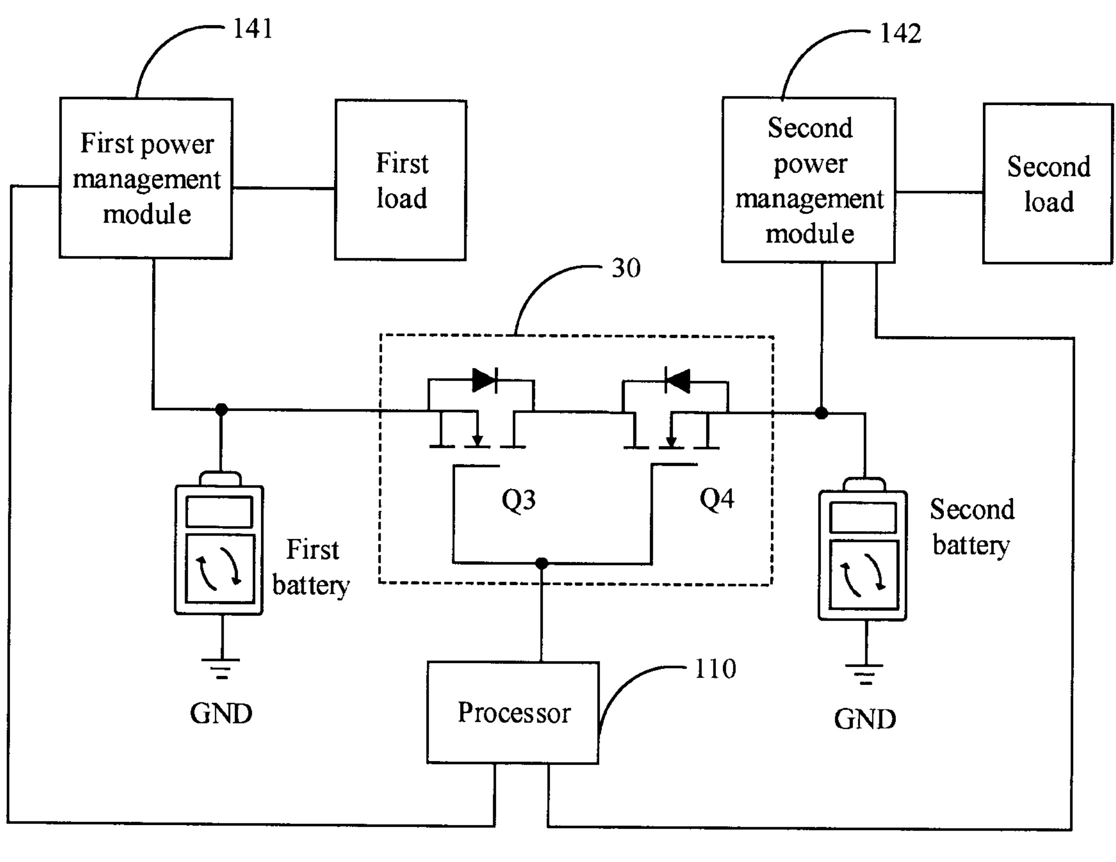
FIG. 10 is a circuit diagram of a fourth isolation circuit according to an embodiment of this application.

As shown in FIG. 10, the isolation circuit 30 includes only an isolation module, and the isolation module includes a third switch element Q3 and a fourth switch element Q4. Both a control terminal of the third switch element Q3 and a control terminal of the fourth switch element Q4 are connected to the processor 110, a first terminal of the third switch element Q3 is connected to the positive electrode of the first battery, a second terminal of the third switch element Q3 is connected to a first terminal of the fourth switch element Q4, and a second terminal of the fourth switch element Q4 is connected to the second battery.

Each of the third switch element Q3 and the fourth switch element Q4 may be implemented by an NMOS transistor with a parasitic diode. The control terminal of the third switch element Q3 is a gate of the third switch element Q3, the first terminal of the third switch element Q3 is a source of the third switch element Q3, and the second terminal of the third switch element Q3 is a drain of the third switch element Q3. The control terminal of the fourth switch element Q4 is a gate of the fourth switch element Q4, the first terminal of the fourth switch element Q4 is a drain of the fourth switch element Q4, and the second terminal of the fourth switch element Q4 is a source of the fourth switch element Q4.

Specifically, the processor 110 may control, by controlling duty ratios of control signals provided to the control terminal of the third switch element Q3 and the control terminal of the fourth switch element Q4, the third switch element Q3 and the fourth switch element Q4 to separately work in a cut-off region, a linear region, and a saturation region. When the third switch element Q3 and the fourth switch element Q4 work in the cut-off region, the isolation module is in an off state. When the third switch element Q3 and the fourth switch element Q4 work in the linear region, the isolation module is in a balanced state. When the third switch element Q3 and the fourth switch element Q4 work in the saturation region, the isolation module is in an on state.

Certainly, in this embodiment of this application, a first control unit may alternatively be disposed in the isolation circuit 30, the first control unit is used to replace the processor 110, and control signals are provided to the third switch element Q3 and the fourth switch element Q4 based on the first control unit, to control the third switch element Q3 and the fourth switch element Q4 to separately work in the cut-off region, the linear region, and the saturation region.

Figure 11:
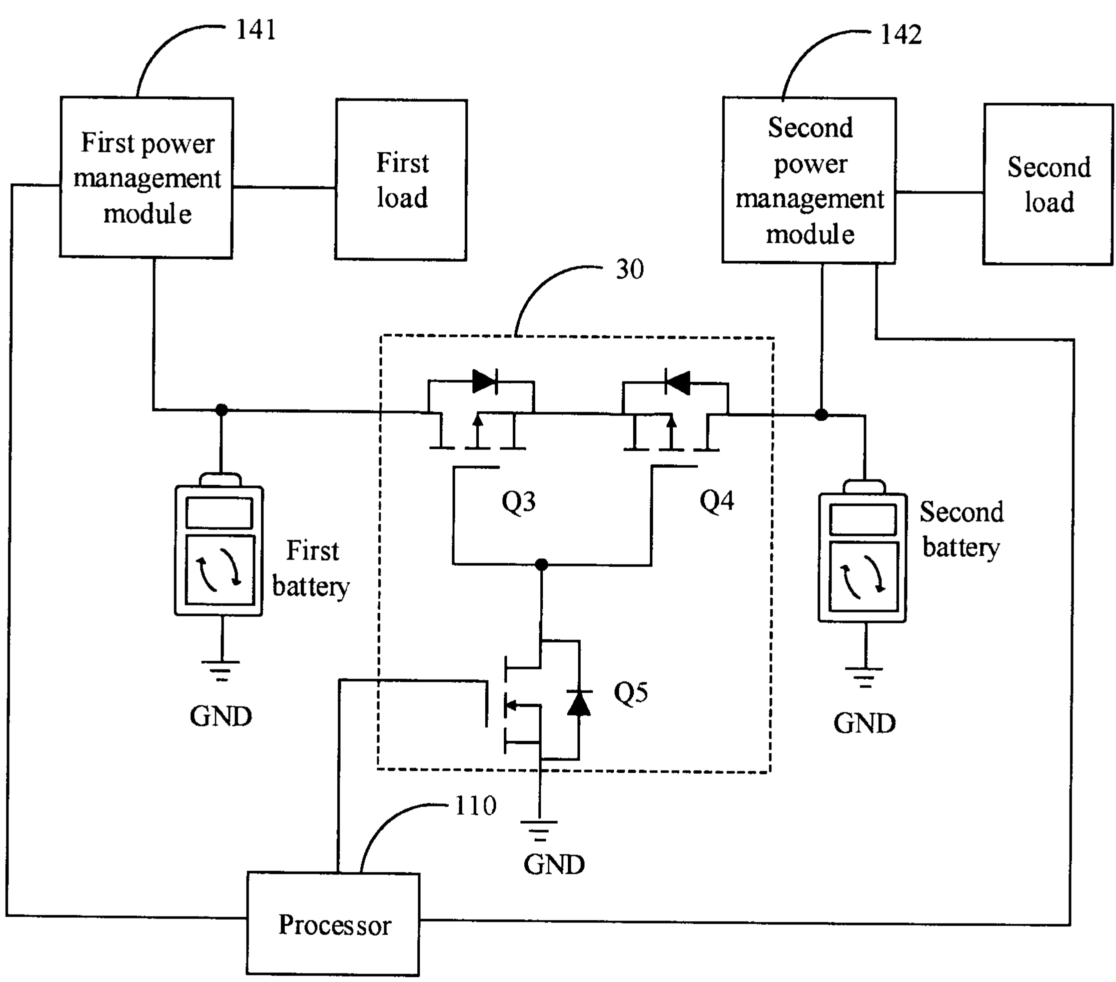
FIG. 11 is a circuit diagram of a fifth isolation circuit according to an embodiment of this application.

As shown in FIG. 11, the isolation circuit 30 includes only an isolation module, and the isolation module includes a third switch element Q3, a fourth switch element Q4, and a fifth switch element Q5. Both a control terminal of the third switch element Q3 and a control terminal of the fourth switch element Q4 are connected to a first terminal of the fifth switch element Q5, a first terminal of the third switch element Q3 is connected to the positive electrode of the first battery, a second terminal of the third switch element Q3 is connected to a first terminal of the fourth switch element Q4, and a second terminal of the fourth switch element Q4 is connected to the positive electrode of the second battery. A control terminal of the fifth switch element Q5 is connected to the processor 110, and a second terminal of the fifth switch element Q5 is connected to a ground terminal GND.

A difference between the isolation circuit 30 shown in FIG. 11 and the isolation circuit 30 shown in FIG. 10 lies in that the third switch element Q3 and the fourth switch element Q4 in the isolation circuit 30 shown in FIG. 11 are implemented by PMOSs with a parasitic diode, and the fifth switch element Q5 is added. The fifth switch element Q5 may be implemented by an NMOS transistor with a parasitic diode, and working statuses of the third switch element Q3 and the fourth switch element Q4 are controlled by using the fifth switch element Q5.

The control terminal of the third switch element Q3 is a gate of the third switch element Q3, the first terminal of the third switch element Q3 is a drain of the third switch element Q3, and the second terminal of the third switch element Q3 is a source of the third switch element Q3. The control terminal of the fourth switch element Q4 is a gate of the fourth switch element Q4, the first terminal of the fourth switch element Q4 is a source of the fourth switch element Q4, and the second terminal of the fourth switch element Q4 is a drain of the fourth switch element Q4. The control terminal of the fifth switch element Q5 is a gate of the fifth switch element Q5, the first terminal of the fifth switch element Q5 is a drain of the fifth switch element Q5, and the second terminal of the fifth switch element Q5 is a source of the fifth switch element Q5.

Specifically, the processor 110 may control, by controlling a duty ratio of a control signal provided to the control terminal of the fifth switch element Q5, the fifth switch element Q5 to separately work in a cut-off region, a linear region, and a saturation region. When the fifth switch element Q5 works in the cut-off region, the third switch element Q3 and the fourth switch element Q4 also work in the cut-off region, so that the isolation module is in an off state. When the fifth switch element Q5 works in the linear region, the third switch element Q3 and the fourth switch element Q4 also work in the linear region, so that the isolation module is in a balanced state. When the fifth switch element Q5 works in the saturation region, the third switch element Q3 and the fourth switch element Q4 also work in the saturation region, so that the isolation module is in an on state.

Certainly, in this embodiment of this application, a first control unit may alternatively be disposed in the isolation circuit 30, the first control unit is used to replace the processor 110, and a control signal is provided to the fifth switch element Q5 based on the first control unit, to control the fifth switch element Q5 to separately work in the cut-off region, the linear region, and the saturation region.

It should be noted that the five different isolation circuits 30 shown in FIG. 7 to FIG. 11 are merely some optional implementations, and constitute no specific limitation on the isolation circuit 30. In some embodiments, the isolation circuit 30 may further include more parts than the isolation circuits 30 shown in FIG. 7 to FIG. 11. For example, a filter module including a capacitor and an inductor is added between the control terminal of the first switch element Q1 shown in FIG. 7 and the processor 110.

In this embodiment of this application, each of the first power management module 141 and the second power management module 142 includes a first switch unit, a second switch unit, and a second control unit. A control terminal of the first switch unit is connected to the second control unit, a first terminal of the first switch unit is connected to a charging interface (for example, a USB interface), and a second terminal of the first switch unit is connected to a corresponding load. The first switch unit is configured to: when the foldable electronic device 100 is in a charged state, convert an input voltage provided by the charging interface into a system voltage, to supply power to the load connected to the first switch unit. A control terminal of the second switch unit is connected to the second control unit, a first terminal of the second switch unit is connected to the second terminal of the first switch unit, and a second terminal of the second switch unit is connected to a corresponding battery. The second switch unit is configured to: when the foldable electronic device 100 is in the charged state, charge the battery connected to the second switch unit by using the system voltage, and when the foldable electronic device 100 is discharged, supply power to a load connected to the second switch unit by using a battery voltage provided by the battery connected to the second switch unit.

The first switch unit includes a sixth switch element Q6, a seventh switch element Q7, an eighth switch element Q8, and an inductor L1, and the second switch unit includes a ninth switch element Q9. A control terminal of the sixth switch element Q6 is connected to the second control unit (not shown in FIG. 6), a first terminal of the sixth switch element Q6 is connected to the charging interface, and a second terminal of the sixth switch element Q6 is connected to a first terminal of the seventh switch element Q7. A control terminal of the seventh switch element Q7 is connected to the second control unit, and a second terminal of the seventh switch element Q7 is connected to a first terminal of the inductor L1. A second terminal of the inductor L1 is connected to a load corresponding to the power management module. A control terminal of the eighth switch element Q8 is connected to the second control unit, a first terminal of the eighth switch element Q8 is connected to the second terminal of the seventh switch element Q7, and a second terminal of the eighth switch element Q8 is connected to a ground terminal GND. A control terminal of the ninth switch element Q9 is connected to the second control unit, a first terminal of the ninth switch element Q9 is connected to the second terminal of the inductor L1, and a second terminal of the ninth switch element Q9 is connected to a corresponding battery.

Specifically, the second terminal of the inductor L1 in the first power management module 141 is connected to the first load, and the second terminal of the ninth switch element Q9 in the first power management module 141 is connected to the first battery. The second terminal of the inductor L1 in the second power management module 142 is connected to the second load, and the second terminal of the ninth switch element Q9 in the second power management module 142 is connected to the second battery.

All of the sixth switch element Q6, the seventh switch element Q7, the eighth switch element Q8, and the ninth switch element Q9 may be NMOS transistors, or all of the sixth switch element Q6, the seventh switch element Q7, the eighth switch element Q8, and the ninth switch element Q9 may be NMOS transistors with parasitic diodes.

The control terminal of the sixth switch element Q6 is a gate of the sixth switch element Q6, the first terminal of the sixth switch element Q6 is a source of the sixth switch element Q6, and the second terminal of the sixth switch element Q6 is a drain of the sixth switch element Q6. The control terminal of the seventh switch element Q7 is a gate of the seventh switch element Q7, the first terminal of the seventh switch element Q7 is a drain of the seventh switch element Q7, and the second terminal of the seventh switch element Q7 is a source of the seventh switch element Q7. The control terminal of the eighth switch element Q8 is a gate of the eighth switch element Q8, the first terminal of the eighth switch element Q8 is a drain of the eighth switch element Q8, and the second terminal of the eighth switch element Q8 is a source of the eighth switch element Q8. The control terminal of the ninth switch element Q9 is a gate of the ninth switch element Q9, the first terminal of the ninth switch element Q9 is a drain of the ninth switch element Q9, and the second terminal of the ninth switch element Q9 is a source of the ninth switch element Q9.

In addition, each of the first power management module 141 and the second power management module 142 further includes a first capacitor C1 and a second capacitor C2. A first terminal of the first capacitor C1 is connected to the second terminal of the sixth switch element Q6, and a second terminal of the first capacitor C1 is connected to a ground terminal GND. The first capacitor C1 may also be referred to as a decoupling capacitor. A first terminal of the second capacitor C2 is connected to the second terminal of the inductor L1, and a second terminal of the second capacitor C2 is connected to a ground terminal GND. The second capacitor C2 may perform filtering processing on a system voltage output by the power management module, to improve stability of the output system voltage.

In an actual product, each of the first power management module 141 and the second power management module 142 may be divided into a chip part and a peripheral circuit part, that is, each of the first power management module 141 and the second power management module 142 includes a power management chip and a peripheral circuit. The power management chip may also be referred to as a PMIC chip or a buck charger (buck charger) chip. The power management chip is configured to control connection or disconnection between a battery and a load, control current-limiting charging of the battery, and the like.

Specifically, all of the sixth switch element Q6, the seventh switch element Q7, the eighth switch element Q8, the ninth switch element Q9, and the second control unit are integrated into the power management chip, that is, the power management chip includes the sixth switch element Q6, the seventh switch element Q7, the eighth switch element Q8, the ninth switch element Q9, and the second control unit, and the peripheral circuit includes the inductor L1, the first capacitor C1, and the second capacitor C2.

As shown in FIG. 6, the power management chip includes a power input pin USB_IN, a serial clock (serial clock, SCL) pin, a serial data (serial data, SDA) pin, a PMID pin, a VSW pin, a VPH_PWR pin, a VCHG_OUT pin, and the like.

The power input pin USB_IN is configured to be connected to the USB interface in the foldable electronic device 100, and the USB interface may be located in the first foldable portion 11. The charger is connected to the USB interface in the foldable electronic device 100 by using a universal serial bus, and the input voltage provided by the charger is transmitted to the power input pin USB_IN by using the USB interface, to provide the input voltage to the power management module.

The SCL pin and the SDA pin in the power management chip are respectively connected to pins corresponding to the processor 110, to implement data transmission between the processor 110 and the power management chip.

The first terminal of the sixth switch element Q6 is actually connected to the USB interface by using the power input pin USB_IN. The first terminal of the first capacitor C1 is connected to the second terminal of the sixth switch element Q6 by using the PMID pin. The second terminal of the seventh switch element Q7 is connected to the first terminal of the inductor L1 by using the VSW pin. The first terminal of the ninth switch element Q9 is connected to the second terminal of the inductor L1 by using the VPH_PWR pin. The second terminal of the ninth switch element Q9 is connected to the corresponding battery by using the VCHG_OUT pin.

When the foldable electronic device 100 is in the charged state, that is, when the USB interface is connected to the charger, the sixth switch element Q6, the seventh switch element Q7, the eighth switch element Q8, and the inductor L1 may convert the input voltage input by the power input pin USB_IN into a system voltage. The system voltage may be provided to the corresponding load, to supply power to the load. In addition, the system voltage may be provided to the ninth switch element Q9 by using the VPH_PWR pin. In this case, the ninth switch element Q9 is controlled to be turned on, and the system voltage may be provided to the corresponding battery by using the ninth switch element Q9 and the VCHG_OUT pin, to charge the battery.

After the battery is charged by using the charger, and the battery is fully charged, the ninth switch element Q9 may be controlled to be in a cut-off state, to disconnect a path between the VCHG_OUT pin and the VPH_PWR pin. The load obtains power through the first switch unit including the sixth switch element Q6, the seventh switch element Q7, the eighth switch element Q8, and the inductor L1, so that when the battery continues to be connected to the charger after being fully charged, power consumed by the load is from the charger, and the battery does not lose power.

When the user unplugs the charger to enable the foldable electronic device 100 to be in the discharged state, the ninth switch element Q9 may be again controlled to be turned on, to control the path between the VCHG_OUT pin and the VPH_PWR pin to be connected. In this case, the battery voltage provided by the battery may be transmitted to the corresponding load by using the ninth switch element Q9, to supply power to the load.

In a scenario in which the battery supplies power to the load, a charging voltage and a charging current of the battery may be monitored in real time. When the charging voltage and/or the charging current exceed/exceeds a threshold, the second control unit may control a working status of the ninth switch element Q9, and increase impedance of the ninth switch element Q9, to reduce the charging voltage and/or the charging current.

In some use processes, when the charger is used to charge the first battery and the second battery, one of the batteries may be first fully charged, and the other battery may not be fully charged. For example, the first battery is first fully charged, and the second battery is not fully charged.

Therefore, in this embodiment of this application, the processor 110 may be further used to control an on state or a cut-off state of the second switch unit in each of the first power management module 141 and the second power management module 142, so that both the first battery and the second battery are fully charged.

Specifically, the foldable electronic device 100 further includes the processor 110, and the processor 110 is separately connected to the first power management module 141 and the second power management module 142. For example, the processor 110 may be separately connected to the second control unit in each of the first power management module 141 and the second power management module 142.

The processor 110 is configured to: when the foldable electronic device 100 is in the charged state, and a fourth target battery is fully charged but a fifth target battery is not fully charged, control a second switch unit in a power management module connected to the fourth target battery to be cut off, and control a second switch unit in a power management module connected to the fifth target battery to be turned on. The fourth target battery is at least one battery in the foldable electronic device 100, and the fifth target battery is at least one battery in the foldable electronic device 100.

In a case, if the first battery is fully charged but the second battery is not fully charged, the fourth target battery is the first battery, and the fifth target battery is the second battery. In this case, the processor 110 may send a control signal to the second control unit in the first power management module 141, so that the second control unit in the first power management module 141 controls the ninth switch element Q9 in the first power management module 141 to be cut off, and the first power management module 141 no longer continues to charge the first battery. In addition, the processor 110 may further send a control signal to the second control unit in the second power management module 142, so that the second control unit in the second power management module 142 controls the ninth switch element Q9 in the second power management module 142 to be turned on, the second power management module 142 continues to charge the second battery, and when the second battery is fully charged, the ninth switch element Q9 is controlled to be cut off.

If a manner, in a related technology, in which a power management module is disposed only in the first foldable portion 11, and no power management module is disposed in the second foldable portion is used, when the first battery is fully charged and the second battery is not fully charged, the ninth switch element Q9 in the power management module disposed in the first foldable portion 11 is turned off, so that the second battery cannot continue to be fully charged.

Therefore, in this embodiment of this application, the first power management module 141 is disposed in the first foldable portion 11, and the second power management module 142 is disposed in the second foldable portion 12, and when the first battery is fully charged but the second battery is not fully charged, the ninth switch element Q9 in the first power management module 141 is controlled to be cut off, to stop charging the first battery, and the ninth switch element Q9 in the second power management module 142 is controlled to be turned on, to continue to charge the second battery, so that both the first battery and the second battery can be fully charged.

In addition, in the manner, in the related technology, in which a power management module is disposed only in the first foldable portion 11, and no power management module is disposed in the second foldable portion, the second battery needs to obtain power from the power management module disposed in the first foldable portion 11. Because there is trace resistance and an isolation circuit between the second battery and the power management module disposed in the first foldable portion 11, a voltage that is finally input to the second battery by the power management module disposed in the first foldable portion 11 is less than a voltage that is input to the first battery by the power management module. In this way, the first battery is fully charged and the second battery is not fully charged. In this embodiment of this application, the second power management module 142 is directly disposed in the second foldable portion 12 to fully charge the second battery. This can reduce trace resistance and an impedance loss of the isolation circuit, so that the second battery can be fully charged.

In conclusion, in this embodiment of this application, in a dual-battery design solution of the foldable electronic device 100, the power management module is disposed in each of the first foldable portion 11 and the second foldable portion 12, forward charging, backward discharging, current-limiting charging, and the like of the two batteries are respectively implemented based on the two power management modules, and a voltage balancing and isolation function is implemented based on the isolation circuit 30 and the two power management modules, to avoid a case in which a high current is formed due to an excessively large voltage difference between the first battery and the second battery.

In addition, the two power management modules may enable both the two batteries to be fully charged in a charging scenario, to resolve a problem that when there are two batteries and a single power management module, one of the batteries cannot be fully charged. In addition, a recharging problem existing when the first load and the second load obtain power from the respective corresponding batteries may be further resolved, so that the first load obtains power from the first battery, and the second load obtains power from the second battery, to reduce a loss caused by trace impedance during power transmission, and save power of the foldable electronic device 100.

In addition, the foldable electronic device 100 in this embodiment of this application may further include OVP circuits respectively disposed in the first foldable portion 11 and the second foldable portion 12, a first fast charging chip disposed in the first foldable portion 11, and a second fast charging chip disposed in the second foldable portion 12.

The OVP circuit disposed in the first foldable portion 11 is connected in series between the USB interface and the power input pin USB_IN in the first power management module 141, and the OVP circuit is configured to protect the first power management module 141, to avoid a case in which the first power management module 141 is damaged because the charger suddenly performs charging with a high voltage or a high current. The OVP circuit disposed in the second foldable portion 12 is connected in series between the USB interface and the power input pin USB_IN in the second power management module 142, and the OVP circuit is configured to protect the second power management module 142, to avoid a case in which the second power management module 142 is damaged because the charger suddenly performs charging with a high voltage or a high current.

The first fast charging chip is configured to quickly charge the first battery. When the first battery is quickly charged by using the first fast charging chip, all of the sixth switch element Q6, the seventh switch element Q7, and the eighth switch element Q8 in the first power management module 141 are in a cut-off state, and the ninth switch element Q9 in the first power management module 141 is turned on, to supply power to the first load.

Correspondingly, the second fast charging chip is configured to quickly charge the second battery. When the second battery is quickly charged by using the second fast charging chip, all of the sixth switch element Q6, the seventh switch element Q7, and the eighth switch element Q8 in the second power management module 142 are in a cut-off state, and the ninth switch element Q9 in the second power management module 142 is turned on, to supply power to the second load.

It should be noted that all of components such as the first battery, the first power management module 141, the first load, and the USB interface included in the first foldable portion 11 may be located on a main board disposed in the first foldable portion 11; and all of components such as the second battery, the isolation circuit, the second power management module 142, and the second load included in the second foldable portion 12 may be located on a main board disposed in the second foldable portion 12.

In all of the foregoing embodiments, descriptions are provided by using two batteries (that is, one battery is disposed in each of the first foldable portion 11 and the second foldable portion 12) as an example. Certainly, this embodiment of this application is also applicable to a multi-battery solution with more than two batteries. For example, the foldable electronic device 100 includes three batteries or four batteries.

In an implementable manner, the foldable electronic device 100 includes a first foldable portion 11 and a second foldable portion 12, the first foldable portion 11 includes a first battery pack, and the second foldable portion 12 includes a second battery pack. The first battery pack includes at least two batteries, and the second battery pack includes one battery. Alternatively, the first battery pack includes one battery, and the second battery pack includes at least two batteries. Alternatively, each of the first battery pack and the second battery pack includes at least two batteries.

All batteries included in the first battery pack are connected to the first power management module 141, and the first power management module 141 controls the battery in the first battery pack to supply power to the first load. All batteries included in the second battery pack are connected to the second power management module 142, and the second power management module 142 controls the battery in the second battery pack to supply power to the second load.

If the foldable electronic device 100 includes at least three batteries, an isolation circuit 30 is connected between two batteries connected to each other. For specific composition and a specific working principle of the isolation circuit 30, refer to the foregoing descriptions.

Figure 12:
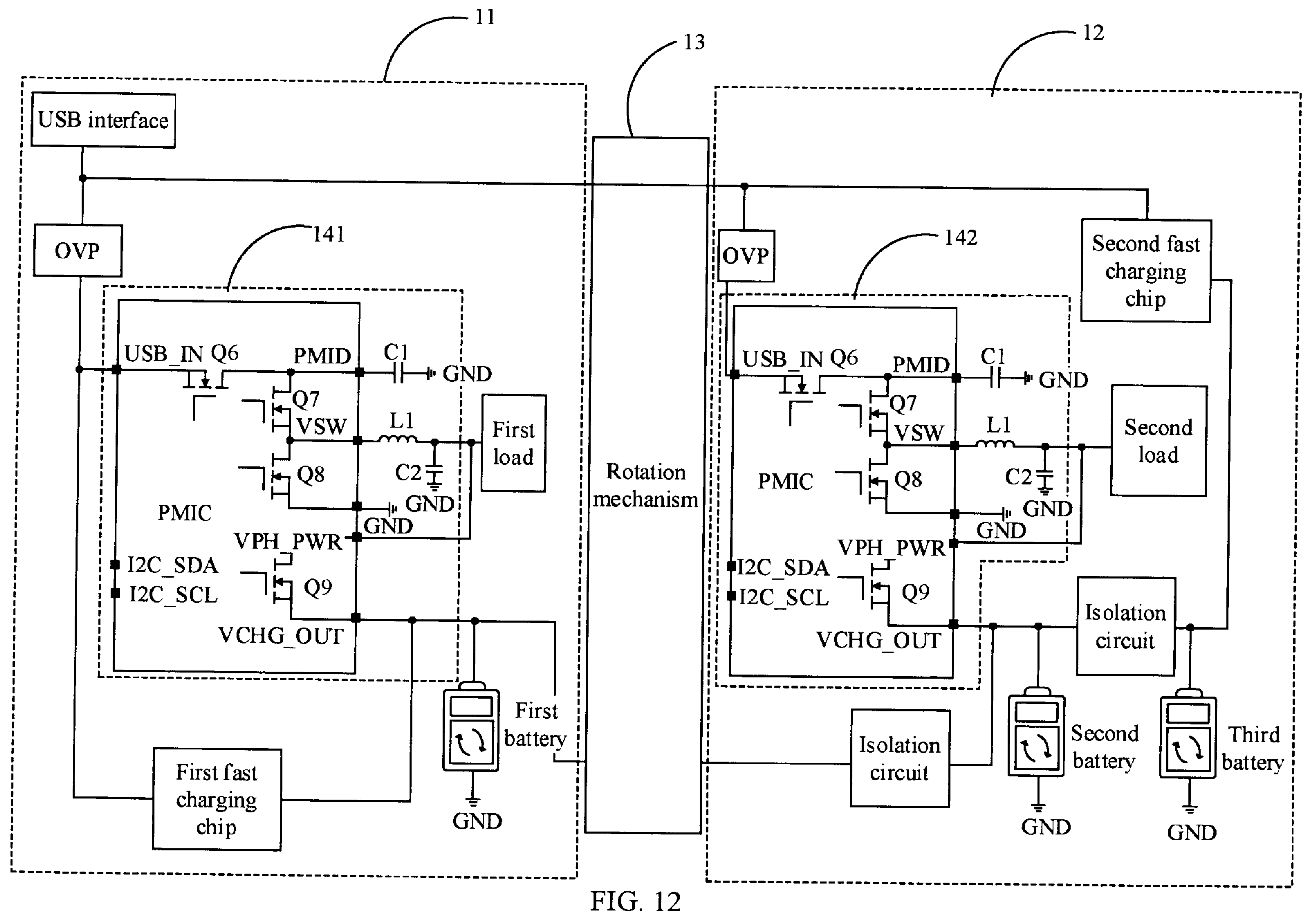
FIG. 12 is a schematic diagram of a circuit structure of another foldable electronic device according to an embodiment of this application.

For example, FIG. 12 is a schematic diagram of a circuit structure of another foldable electronic device according to an embodiment of this application. On the basis of FIG. 6, the second foldable portion 12 further includes a third battery and another isolation circuit connected between the second battery and the third battery. In this case, the foldable electronic device 100 includes three batteries. The first battery is located in the first foldable portion 11, and both the second battery and the third battery are located in the second foldable portion 12. One end of one isolation circuit is connected to a positive electrode of the first battery, and the other end is connected to a positive electrode of the second battery. One end of the other isolation circuit is connected to the positive electrode of the second battery, and the other end is connected to a positive electrode of the third battery.

The isolation circuit connected between the second battery and the third battery is configured to perform voltage balancing on the second battery and the third battery connected to the isolation circuit, to change impedance in a path between the second battery and the third battery, so as to reduce a voltage difference between the second battery and the third battery.

Specifically, an electrical parameter related to the second battery and the third battery may be detected by using an electrical parameter detection module, so that a processor 110 or a first control unit in the isolation circuit connected between the second battery and the third battery controls a working status of an isolation module in the isolation circuit connected between the second battery and the third battery. The electrical parameter related to the second battery and the third battery includes a voltage of the second battery and a voltage of the third battery, or the electrical parameter related to the second battery and the third battery includes a current flowing through the isolation module in the isolation circuit connected between the second battery and the third battery.

It may be understood that in this embodiment of this application, two batteries connected to any isolation circuit may be respectively referred to as a first target battery and a second target battery. An isolation circuit connected between the first battery and the second battery is used as an example. In this case, the first target battery may be the first battery, and the second target battery may be the second battery. Alternatively, the isolation circuit connected between the second battery and the third battery is used as an example. In this case, the first target battery may be the second battery, and the second target battery may be the third battery.

In addition, in this embodiment of this application, a quantity of isolation circuits may be determined based on a quantity of batteries. For example, if the foldable electronic device 100 includes the three batteries shown in FIG. 12, there are two isolation circuits in the foldable electronic device 100. Alternatively, if the foldable electronic device 100 includes four batteries, where an example in which the first battery pack includes two batteries and the second battery pack includes two batteries is used, one isolation circuit is connected between the two batteries included in the first battery pack, one isolation circuit is connected between the two batteries included in the second battery pack, and one isolation circuit is connected between the first battery pack and the second battery pack, that is, there are three isolation circuits in this case.

The objectives, technical solutions, and beneficial effects of this application are further described in detail in the foregoing specific implementations. It should be understood that the foregoing descriptions are merely specific implementations of this application, but are not intended to limit the protection scope of this application. Any modification, equivalent replacement, improvement, or the like made based on the technical solutions of this application shall fall within the protection scope of this application.

The invention claimed is:

1. A foldable electronic device, comprising:

a first foldable portion, comprising:

a first load;

a first battery pack comprising a first target battery; and a first power management module separately connected to the first battery pack and the first load, wherein the first power management module is configured to control the first battery pack to supply power to the first load;

a second foldable portion, comprising:

a second load;

a second battery pack comprising a second target battery; and a second power management module separately connected to the second battery pack and the second load, wherein the second power management module is configured to control the second battery pack to supply power to the second load;

a rotation mechanism located between the first foldable portion and the second foldable portion; and an isolation circuit separately connected to the first target battery and the second target battery, wherein the isolation circuit is configured to perform voltage balancing on voltages of the first target battery and the second target battery.

2. The foldable electronic device of claim 1, further comprising an electrical parameter detection module and a processing module, wherein the isolation circuit comprises an isolation module, and the processing module is separately connected to the electrical parameter detection module and the isolation module, wherein the electrical parameter detection module is configured to detect an electrical parameter related to the first target battery and the second target battery, wherein the electrical parameter comprises a) a voltage of the first target battery and a voltage of the second target battery, or b) a current flowing through the isolation module, and wherein the processing module is configured to control a working status of the isolation module based on the electrical parameter, wherein the working status of the isolation module comprises any one of an on state, a balanced state, and an off state.

3. The foldable electronic device of claim 2, wherein the processing module is a processor in the foldable electronic device, and the processor and the isolation circuit are two separate components.

4. The foldable electronic device of claim 2, wherein the electrical parameter detection module comprises a first voltage detection element and a second voltage detection element, the first voltage detection element is connected to the first target battery, and the second voltage detection element is connected to the second target battery, wherein the first voltage detection element is configured to detect the voltage of the first target battery, wherein the second voltage detection element is configured to detect the voltage of the second target battery, and wherein the electrical parameter comprises the voltage of the first target battery and the voltage of the second target battery.

5. The foldable electronic device of claim 2, wherein the electrical parameter detection module comprises a current detection element, and the current detection element is connected to a path between the first target battery and the second target battery, wherein the current detection element is configured to detect the current flowing through the isolation module, and wherein the electrical parameter comprises the current flowing through the isolation module.

6. The foldable electronic device of claim 2, wherein when the foldable electronic device is in a discharged state, and the electrical parameter does not meet a preset condition, the processing module is configured to control the isolation module to be in the balanced state to perform voltage balancing on the voltage of the first target battery and the voltage of the second target battery, wherein when the foldable electronic device is in a charged state, and the electrical parameter does not meet the preset condition, the processing module is configured to control a power management module connected to a third target battery to charge the third target battery until the electrical parameter meets the preset condition, wherein the third target battery is one of the first target battery and the second target battery that has a lower voltage, and wherein the electrical parameter does not meet the preset condition when a voltage difference between the first target battery and the second target battery is greater than a preset voltage, or when the current flowing through the isolation module is greater than a preset current.

7. The foldable electronic device of claim 2, wherein when the electrical parameter meets a preset condition, the processing module is configured to control the isolation module to be in the on state, so that the first target battery and the second target battery are discharged or charged in parallel, and wherein the electrical parameter meets the preset condition when a voltage difference between the first target battery and the second target battery is less than or equal to a preset voltage or when the current flowing through the isolation module is less than or equal to a preset current.

8. The foldable electronic device of claim 2, wherein the isolation module comprises a first switch element, and wherein a first terminal of the first switch element is connected to the first target battery, and a second terminal of the first switch element is connected to the second target battery.

9. The foldable electronic device of claim 8, wherein a control terminal of the first switch element is connected to the processing module.

10. The foldable electronic device of claim 2, wherein the isolation module comprises a third switch element and a fourth switch element, and wherein a first terminal of the third switch element is connected to the first target battery, a second terminal of the third switch element is connected to a first terminal of the fourth switch element, and a second terminal of the fourth switch element is connected to the second target battery.

11. The foldable electronic device of claim 10, wherein both a control terminal of the third switch element and a control terminal of the fourth switch element are connected to the processing module.

12. The foldable electronic device of claim 1, wherein the first power management module comprises a first switch unit, a second switch unit, and a second control unit, wherein a control terminal of the first switch unit is connected to the second control unit, a first terminal of the first switch unit is connected to a charging interface, and a second terminal of the first switch unit is connected to a corresponding load, wherein when the foldable electronic device is in a charged state, the first switch unit is configured to convert an input voltage provided by the charging interface into a system voltage, to supply power to the corresponding load connected to the first switch unit, wherein a control terminal of the second switch unit is connected to the second control unit, a first terminal of the second switch unit is connected to the second terminal of the first switch unit, and a second terminal of the second switch unit is connected to a corresponding battery, wherein when the foldable electronic device is in the charged state, the second switch unit is configured to charge the battery connected to the second switch unit with the system voltage, and wherein when the foldable electronic device is discharged, the second switch unit is configured to supply power to a load connected to the second switch unit with a battery voltage provided by the battery connected to the second switch unit.

13. The foldable electronic device of claim 12, further comprising a processor that is separately connected to the first power management module and the second power management module, wherein when the foldable electronic device is in the charged state, and a fourth target battery is fully charged but a fifth target battery is not fully charged, the processor is configured to:

control the second switch unit in a power management module connected to the fourth target battery to be cut off, and control the second switch unit in a power management module connected to the fifth target battery to be turned on, wherein the fourth target battery is at least one battery in the foldable electronic device, and the fifth target battery is at least one battery in the foldable electronic device.

14. The foldable electronic device of claim 12, wherein the first switch unit comprises a sixth switch element, a seventh switch element, an eighth switch element, and an inductor, and the second switch unit comprises a ninth switch element, wherein a control terminal of the sixth switch element is connected to the second control unit, a first terminal of the sixth switch element is connected to the charging interface, and a second terminal of the sixth switch element is connected to a first terminal of the seventh switch element, wherein a control terminal of the seventh switch element is connected to the second control unit, a second terminal of the seventh switch element is connected to a first terminal of the inductor, and a second terminal of the inductor is connected to a load corresponding to the power management module, wherein a control terminal of the eighth switch element is connected to the second control unit, a first terminal of the eighth switch element is connected to the second terminal of the seventh switch element, and a second terminal of the eighth switch element is connected to a ground terminal, and wherein a control terminal of the ninth switch element is connected to the second control unit, a first terminal of the ninth switch element is connected to the second terminal of the inductor, and a second terminal of the ninth switch element is connected to a corresponding battery.

15. The foldable electronic device of claim 1, wherein each of the first battery pack and the second battery pack comprises one battery, the foldable electronic device comprises one isolation circuit, and the isolation circuit is located in the first foldable portion or the second foldable portion.

16. The foldable electronic device of claim 2, wherein the processing module is a first control unit in the isolation circuit.

17. The foldable electronic device of claim 8, wherein the isolation module further comprises a second switch element, and a control terminal of the second switch element is connected to the processing module, a first terminal of the second switch element is connected to a control terminal of the first switch element, and a second terminal of the second switch element is connected to a ground terminal.

18. The foldable electronic device of claim 10, wherein the isolation module further comprises a fifth switch element, and a control terminal of the fifth switch element is connected to the processing module, a first terminal of the fifth switch element is connected to a control terminal of the third switch element and a control terminal of the fourth switch element, and a second terminal of the fifth switch element is connected to a ground terminal.

19. The foldable electronic device of claim 12, wherein the second power management module comprises a first switch unit, a second switch unit, and a second control unit, wherein a control terminal of the first switch unit of the second power management module is connected to the second control unit of the second power management module, a first terminal of the first switch unit of the second power management module is connected to a charging interface of the second power management module, and a second terminal of the first switch unit of the second power management module is connected to a corresponding load, wherein when the foldable electronic device is in a charged state, the first switch unit of the second power management module is configured to convert an input voltage provided by the charging interface of the second power management module into a system voltage, to supply power to the corresponding load connected to the first switch unit of the second power management module, wherein a control terminal of the second switch unit of the second power management module is connected to the second control unit of the second power management module, a first terminal of the second switch unit of the second power management module is connected to the second terminal of the first switch unit of the second power management module, and a second terminal of the second switch unit of the second power management module is connected to a corresponding battery, wherein when the foldable electronic device is in the charged state, the second switch unit of the second power management module is configured to charge the battery connected to the second switch unit of the second power management module with the system voltage, and wherein when the foldable electronic device is discharged, the second switch unit of the second power management module is configured to supply power to a load connected to the second switch unit with a battery voltage provided by the battery connected to the second switch unit.

20. The foldable electronic device of claim 1, wherein a first one of the two batteries is in the first battery pack, and a second one of the two batteries is in the second battery pack.

* * * * *